United States Patent [19]

Tsuchiya et al.

[11] Patent Number: 4,989,018
[45] Date of Patent: Jan. 29, 1991

[54] RECORDING APPARATUS HAVING LINEAR ARRAY OF DOT-FORMING ELEMENTS FOR LINE-BY-LINE RECORDING, INCLUDING MEANS OF IMPROVING IMAGE QUALITY

[75] Inventors: Michio Tsuchiya, Nagoya; Masaaki Terazawa, Ichinomiya; Yutaka Nonomura, Iwakura, all of Japan

[73] Assignee: Brother Kogyo Kabushiki Kaisha, Aichi, Japan

[21] Appl. No.: 383,602

[22] Filed: Jul. 24, 1989

[30] Foreign Application Priority Data

Jul. 27, 1988 [JP] Japan .................................. 63-187160
Oct. 24, 1988 [JP] Japan .................................. 63-266062

[51] Int. Cl.$^5$ .......................... G01D 15/10; H04N 1/21
[52] U.S. Cl. .................................. 346/76 PH; 358/296; 358/298
[58] Field of Search ................... 346/76 PH; 358/296, 358/298

[56] References Cited

U.S. PATENT DOCUMENTS 4,630,068 12/1986 Ims .................................. 346/76 PH

Primary Examiner—Bruce A. Reynolds
Assistant Examiner—Huan Tran
Attorney, Agent, or Firm—Oliff & Berridge

[57] ABSTRACT

A recording apparatus for recording images in the form of a multiplicity of dots, including a print head having a linear array of dot-forming elements for forming dots along a straight line, a supporting device for supporting a recording medium in facing relation with the print head, a feeding device for feeding the recording medium and the print head relative to each other in a feeding direction which intersects the straight line of dots, and a control device for controlling the dot-forming elements to effect a primary recording operation for recording a plurality of primary lines according to respective sets of primary line data, such that the primary lines are equally spaced from each other in the feeding direction. The control device controls the dot-forming elements to also effect a secondary or supplemental recording operation for recording at least one secondary line between adjacent two lines of the plurality of primary lines, according to secondary line data. The secondary line data is prepared based on at least one of the two sets of primary line data which represent the adjacent two primary lines, respectively, such that the secondary lines improve a quality of the images recorded on the recording medium.

17 Claims, 20 Drawing Sheets

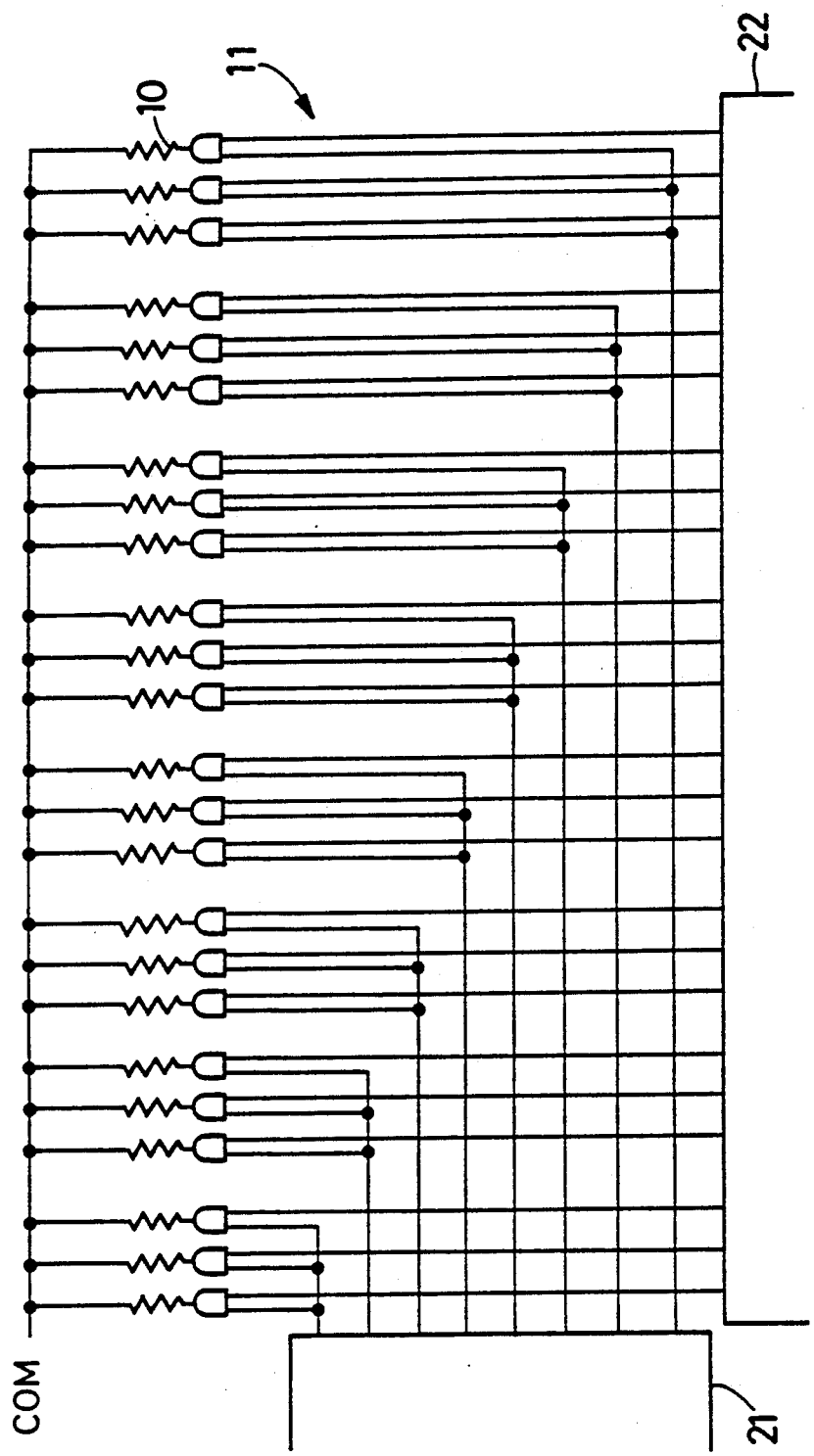

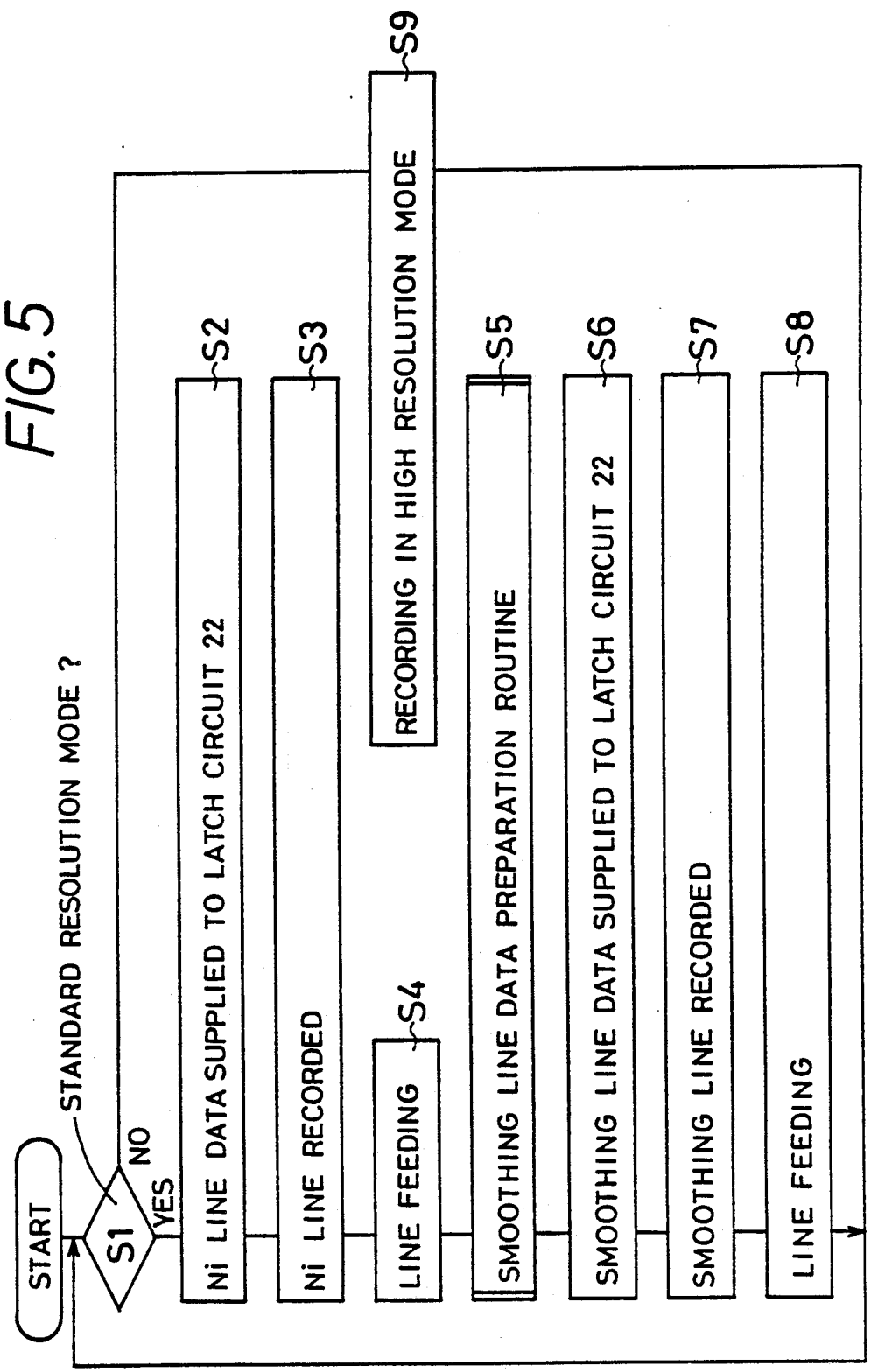

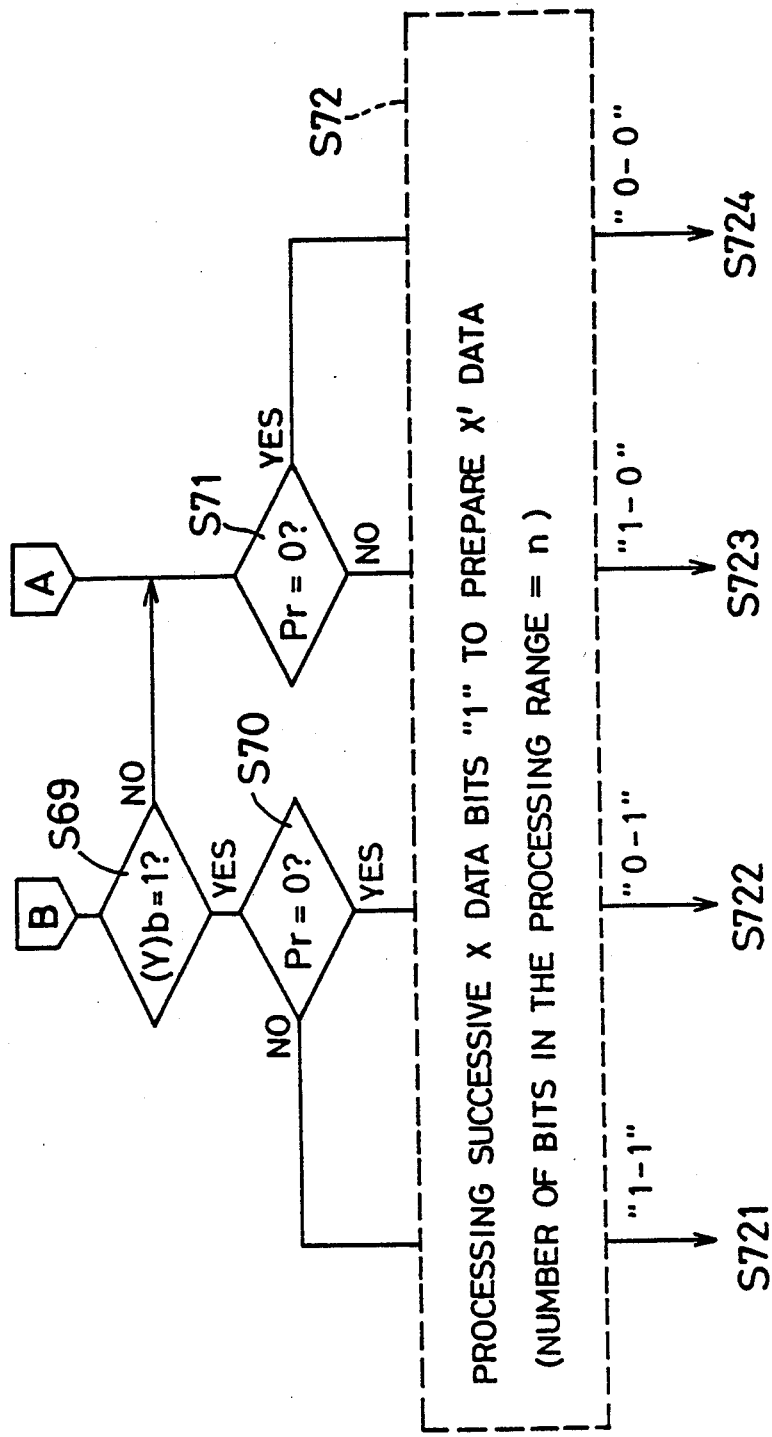

↓ "1-1"  S721  FIG. 7D  "0-1" ↓

S721
(i) WHERE f = 1
  X' = Ni LINE DATA BITS --- FIG. 9A
(ii) WHERE n ≧ 8
  a) WHERE m = 1
    X' = Ni LINE DATA BITS --- FIG. 9B
  b) WHERE m = 0
    X' = "1"
    FOR ONLY FIRST AND LAST BITS IN THE RANGE
      --- FIG. 9C
(iii) WHERE n < 8
  X' = Ni LINE DATA BITS --- FIG. 9D

S722
(i) WHERE f = 1
  X' = Ni LINE DATA BITS --- FIG. 10A
(ii) WHERE n ≧ 8
  a) WHERE m = 1
    X' = "0"
    FOR ONLY FIRST FOUR BITS IN THE RANGE
      --- FIG. 10B
  b) WHERE m = 0
    X' = "1"
    FOR ONLY LAST FOUR BITS IN THE RANGE
      --- FIG. 10C
(iii) WHERE n < 8
  X' = "0", FOR THE FIRST HALF OF THE RANGE
  X' = "1", FOR THE SECOND HALF OF THE RANGE
    --- FIG. 10D

(i) WHERE f = 1
   X' = Ni LINE DATA --- FIG. 11A (ii) WHERE n ≥ 8
   a) WHERE m = 1
      X' = "0"
      FOR ONLY LAST FOUR BITS IN THE RANGE
                    --- FIG. 11B
   b) WHERE m = 0
      X' = "1"
      FOR ONLY FIRST FOUR BITS IN THE RANGE
                    --- FIG. 11C (iii) WHERE n < 8
   X' = "1", FOR THE FIRST HALF OF THE RANGE
   X' = "0", FOR THE SECOND HALF OF THE RANGE
                    --- FIG. 11D

S724

(i) WHERE f = 1
   X' = Ni LINE DATA --- FIG. 12A (ii) WHERE m = 1
   X' = "0"
   FOR ONLY FIRST AND LAST BITS IN THE RANGE
                    --- FIG. 12B (iii) WHERE m = 0
   X' = Ni LINE DATA --- FIG. 12C

↓ TO S75          ↓ TO S76

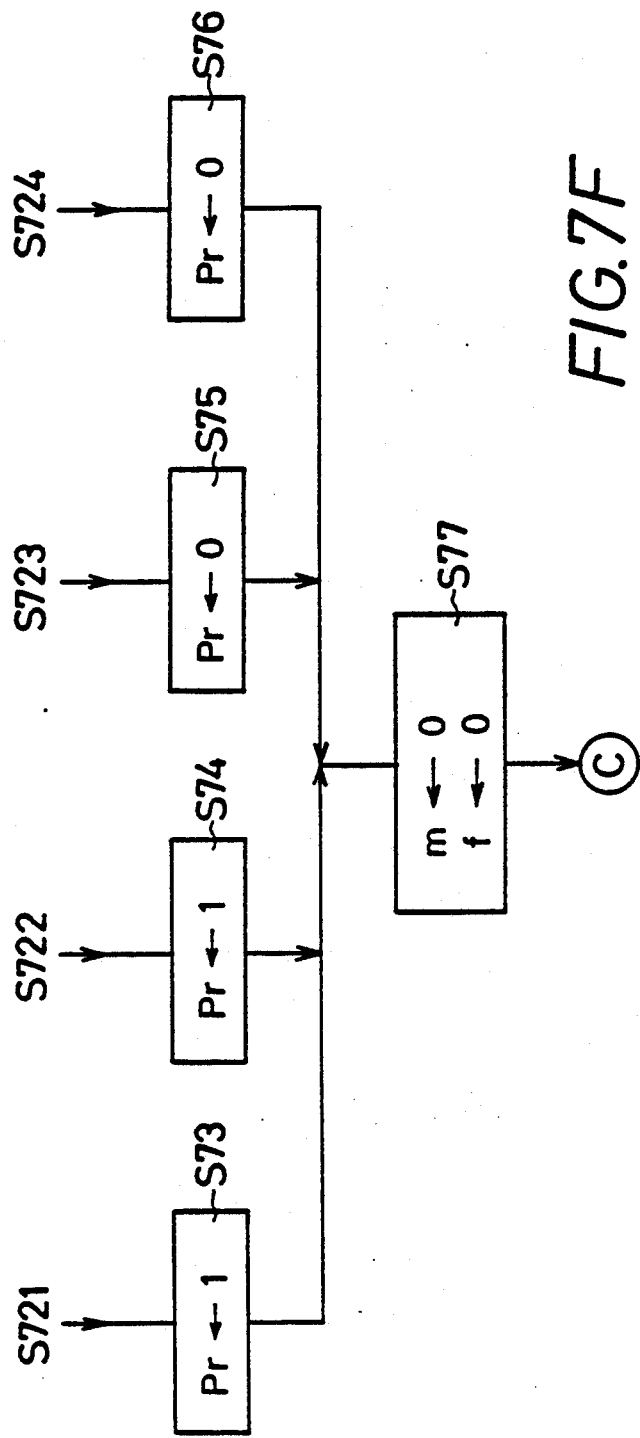

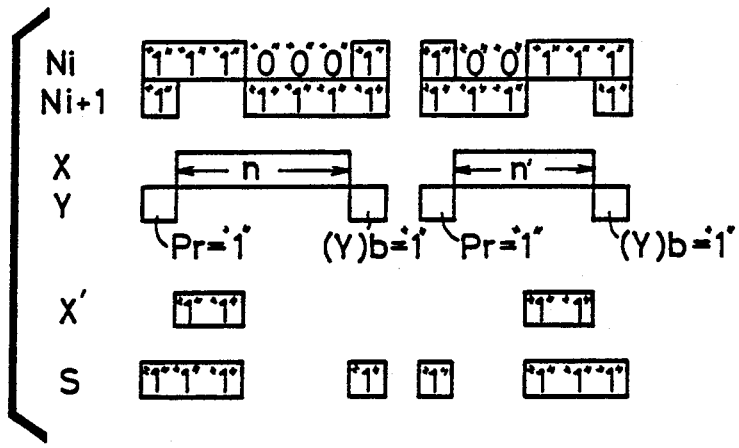

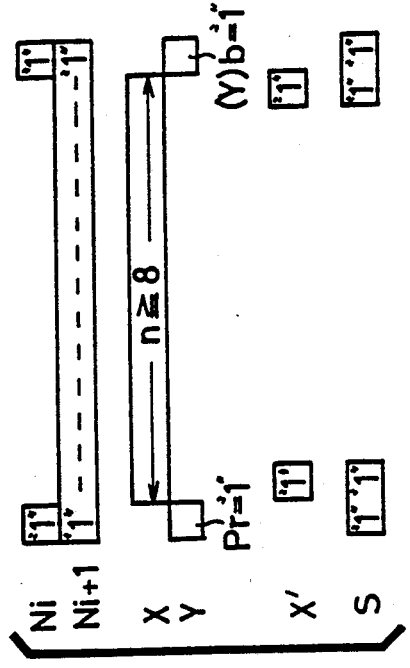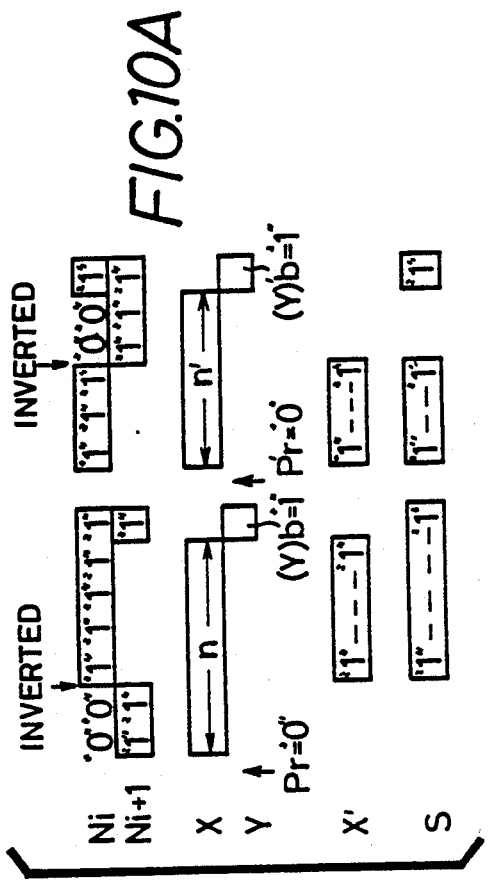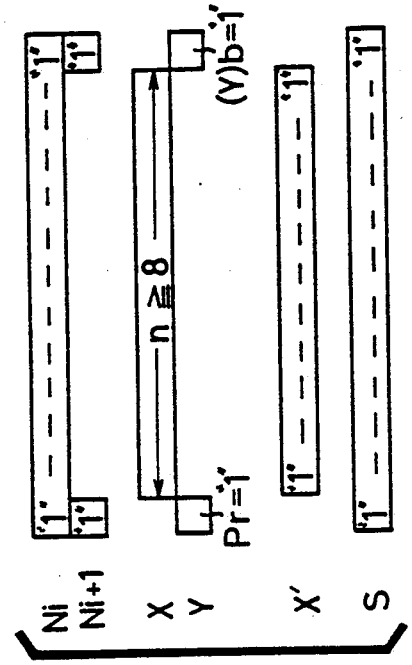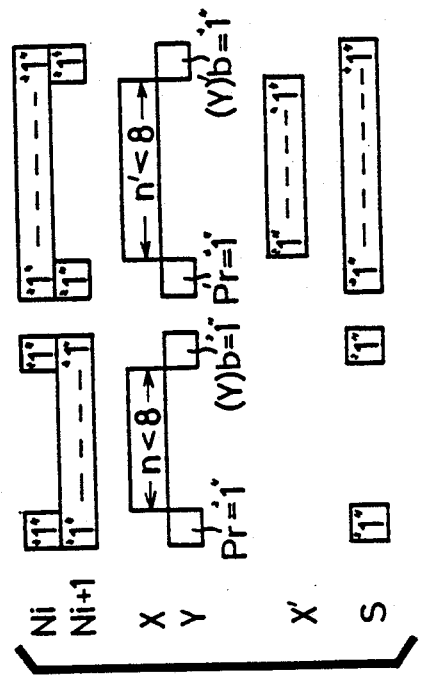

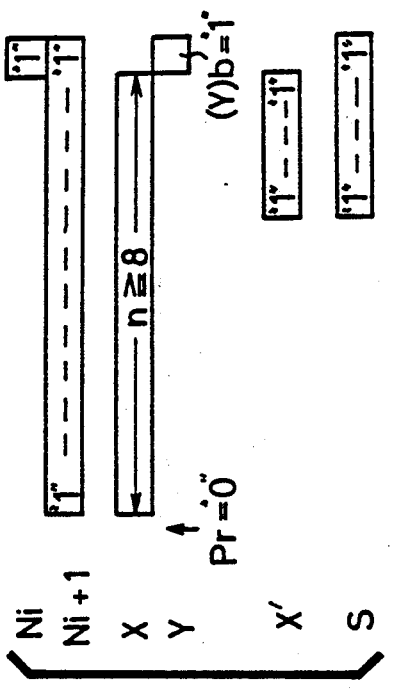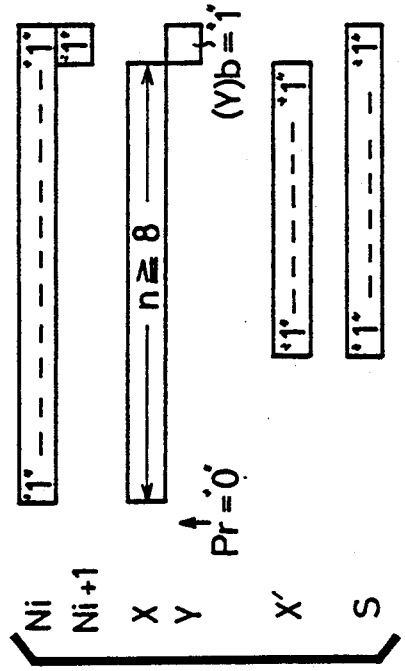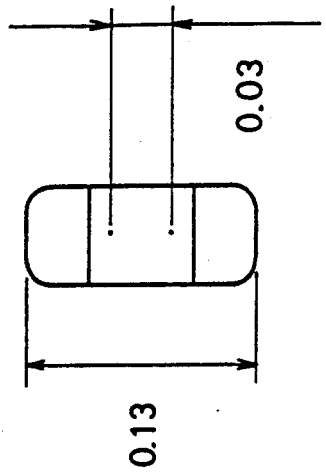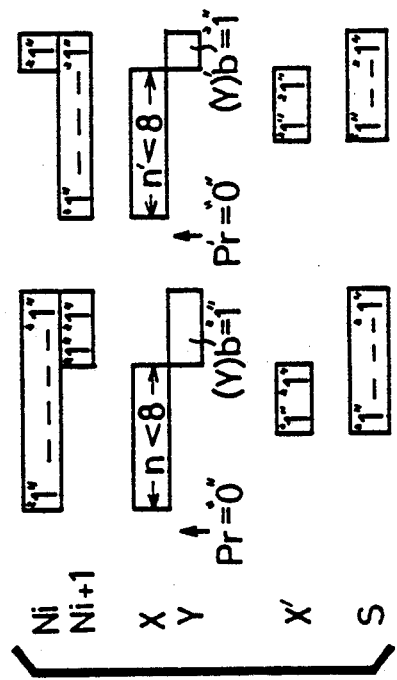

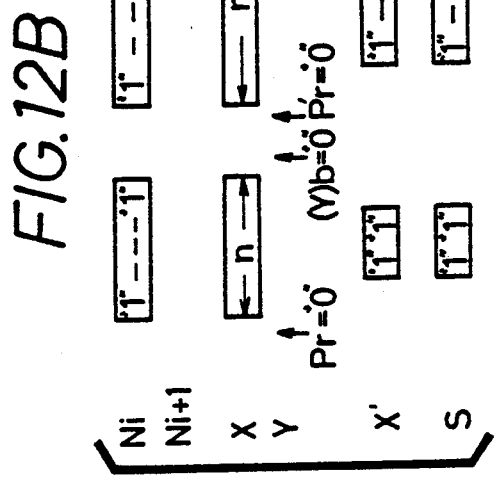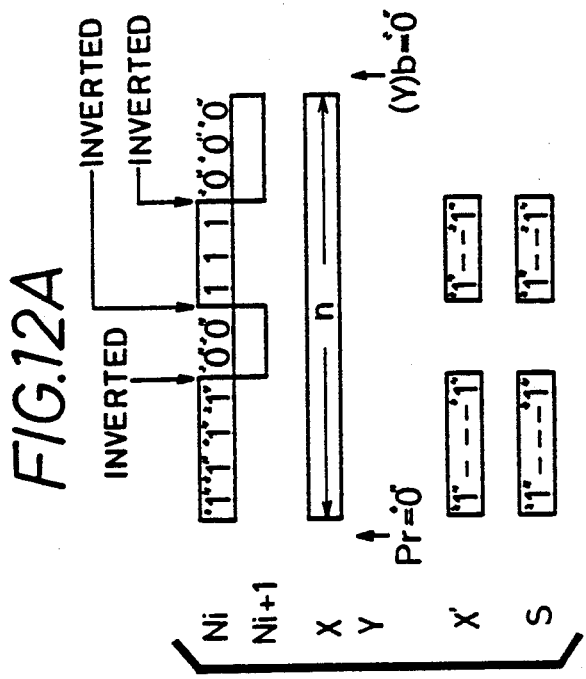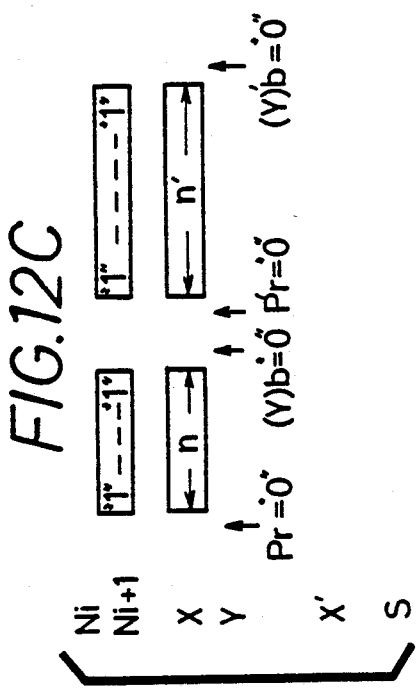

FIG.13A-2 NI INVERTED

NI INVERTED

FIG.15A-1
PRIOR ART
FIG.15A-2
Ni INVERTED
FIG.15B-1
PRIOR ART
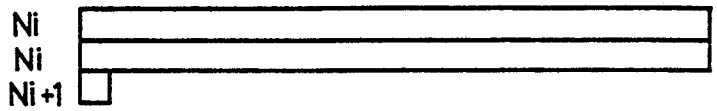
FIG.15B-2
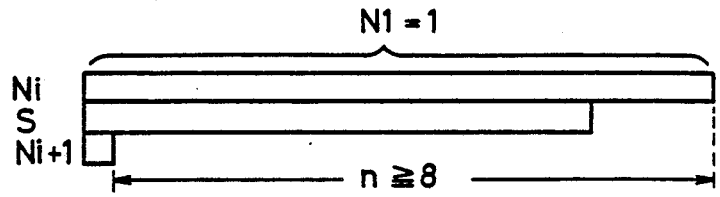
FIG.15C-1
PRIOR ART
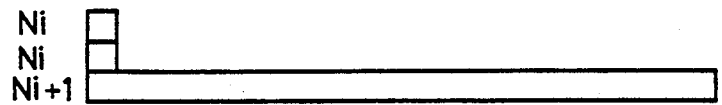
FIG.15C-2
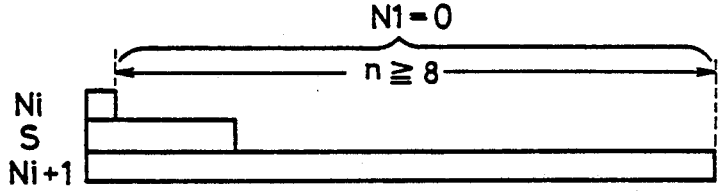
FIG.15D-1
PRIOR ART
FIG.15D-2
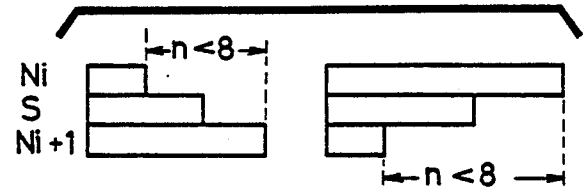

RECORDING APPARATUS HAVING LINEAR ARRAY OF DOT-FORMING ELEMENTS FOR LINE-BY-LINE RECORDING, INCLUDING MEANS OF IMPROVING IMAGE QUALITY

BACKGROUND OF THE INVENTION

1. Field of the Invention

The present invention relates to a recording apparatus, such as a facsimile receiver, which has a linear array of dot-forming elements, for recording images such as letters, symbols and graphical representations, in the form of dots arranged in a plurality of parallel lines, according to a batch of line data representative of lines of information to be recorded. For example, a facsimile receiver has a thermal print head having a multiplicity of heat-generating elements arranged in a straight row parallel to the lines to be recorded on a heat-sensitive paper supported on a platen. The heat-generating elements are selectively energized to record each line according to a corresponding set of line data indicative of the presence and absence of dots at predetermined recording positions equally spaced from each other along the line. Upon completion of recording of each line, the paper is fed by a suitable feeding device, by a predetermined incremental distance in the direction perpendicular to the row of the heat-generating elements. The facsimile receiver may have two different modes of recording, e.g., a standard recording mode in which a single set of line data is used to record two successive lines, and a fine or high-resolution recording mode in which each line is recorded according to the corresponding set of line data.

In the standard recording mode, therefore, the dot pattern of the first one of the two successive lines accurately represents the original image to be reproduced, but the dot pattern of the second line is identical with that of the first line, irrespective of the image in the corresponding original line. In other words, the second line of the two successive lines recorded according to a set of line data is not an accurate reproduction of the original image. In this respect, the fine or high-resolution recording mode is suitably used when the original images to be reproduced include intricate or minute patterns, or curved or inclined lines or shapes. In the standard recording mode, even these patterns of images are recorded such that two successive lines are recorded with the heat-generating elements energized according to a same set of line data. Thus, it will be understood that the resolution of the images recorded in the standard recording mode is lowered to a half of that in the high-resolution mode.

Where a curved or inclined line intersecting the direction of arrangement of the dot-forming elements is recorded in the standard recording mode, the dot in the second line of the two lines recorded according to each set of line data is located at the same position as the dot in the first line, as viewed in the direction parallel to the lines. That is, the position of the dot in the second line is offset from the actual position of the curved or inclined line, i.e., from the intersection of the original curved or inclined line and the recorded second line. Accordingly, the recorded curved or inclined line includes straight segments parallel to the feeding direction of the paper, and therefore includes stepped portions, which make it difficult for the reader to recognize the recorded image as a continuously or smoothly curved or inclined line similar to the original image.

Thus, the image reproduction accuracy or resolution in the standard recording mode is considerably lower than that in the high-resolution recording mode.

On the other hand, it is noted that the size of the dots recorded on a heat-sensitive paper by heat-generating elements as the dot-forming elements is almost equal to the effective recording size of the heat-generating elements. If the effective recording size of the heat-generating elements in the feeding direction of the paper is smaller than the incremental feeding distance of the paper (i.e., line spacing), there is left a blank spacing between adjacent two lines, or between recorded dots in the adjacent two lines.

To eliminate such a blank spacing, it is proposed to increase an energy supplied to the heat-generating elements, for thereby enlarging the size of the dots recorded on the heat-sensitive paper by the energized heat-generating elements. This solution is based on the fact that the dot size increases with the amount of heat generated by the heat-generating elements.

However, the increase in the electric power applied to the heat-generating elements results in shortening the life expectancy of the heat-generating elements and therefore lowering the durability of the recording apparatus per se. Further, the increase in the amount of heat applied to the heat-sensitive paper leads to difficulty in controlling the shape of the recorded dots, namely, tendency toward rounding of the dot shape, whereby the quality of the recorded image is lowered. Moreover, the above solution requires an increased amount of power consumption for energizing the heat-generating elements, and consequently requires a relatively large power source, thereby resulting in increased size and cost of the apparatus.

SUMMARY OF THE INVENTION

It is therefore an object of the present invention to provide a recording apparatus having a linear array of dot-forming elements, which permits relatively improved quality of recorded images, even when the apparatus is placed in a mode other than a fine or high-resolution mode.

The above object may be accomplished according to one aspect of the present invention, which provides a recording apparatus for recording images such as characters and graphical representations, in the form of dots arranged in parallel lines on a planar recording medium, comprising: (a) a print head having a linear array of dot-forming elements for forming dots along a straight line; (b) medium support means for supporting the recording medium, such that the print head faces a recording surface of the recording medium; (c) feeding means for feeding the recording medium and the print head relative to each other in a feeding direction which intersects the straight line; and (d) control means for controlling the dot-forming elements to effect a primary recording operation for recording a plurality of primary lines according to respective sets of primary line data, such that the primary lines are equally spaced from each other in the feeding direction, and to effect a secondary recording operation for recording at least one secondary line between adjacent two lines of the plurality of primary lines, according to secondary line data. The secondary line data is prepared based on at least one of the two sets of primary line data which represent the adjacent two primary lines, respectively, such that the secondary line or lines improve a quality of the images recorded on the recording medium.

In the recording apparatus of the present invention constructed as described above, the secondary line data is prepared based on one or both of the two sets of primary line data, so that the secondary line or lines to be recorded according to the secondary line data between the adjacent two primary lines recorded according to the respective sets of primary line data improve the quality of the images recorded by the dot-forming elements, even though the images are not formed by the lines of dots each of which is recorded according to the corresponding set of primary line data as in an ordinary high-resolution recording mode. The smoothing line or lines serve to enhance the image reproduction accuracy or resolution, and eliminate a blank space between adjacent two recording lines, which would be left where the effective recording size of the dot-forming elements is smaller than the thickness of the line spacing.

In a first form of the present invention, the secondary line data consists of smoothing line data which is prepared based on both of the two sets of primary line data which respectively represent the adjacent two primary lines which are recorded immediately before and after the secondary line. The smoothing line data are representative of a smoothing line or lines as the secondary line or lines, for improving the accuracy of reproduction of original images, by connecting the dots of the adjacent two primary lines by the dots of smoothing line or lines. Usually, only one smoothing line is inserted between the adjacent two primary lines. Therefore, the smoothing line increases the continuity of images even when the images include curved and/or inclined lines, while assuring a high degree of squareness or sharpness at rectangular corner portions or crisscrossing portions of the images.

In a second form of the invention, the dot-forming elements comprise a plurality of heat-generating elements, and the secondary line data consists of one of the two sets of primary line data which represents one of the adjacent two primary lines that is recorded before the secondary line or lines. In this case, each secondary line has the same pattern of dots as the above-indicated one of the adjacent two primary lines. This arrangement is effective to eliminate a blank space between the adjacent two primary lines, which would be left if the secondary line or lines were not provided in the case where the size of the dots formed by the heat-generating elements is smaller than the predetermined line spacing. In other words, the size of the composite dots formed by the dots in the primary and secondary lines can be larger than the effective recording size of the heat-generating elements. Further, the print head does not require an increased amount of energy to energize the heat-generating elements for eliminating the blank space, as used in the known recording apparatus. Accordingly, the required capacity of the power source for the print head can be reduced, whereby the size and cost of the recording apparatus can be reduced.

In one arrangement of the above second form of the invention, the control means is adapted to selectively energize the heat-generating elements to effect the primary recording operation such that upper edges of the heat-generating elements are substantially aligned with an upper end of the above-indicated one of the adjacent two primary lines, and controls the feeding means to feed the recording medium and the print head relative to each other in the feeding direction after the primary recording operation and before the secondary recording operation, so that the secondary recording operation is effected such that lower edges of the heat-generating elements are substantially aligned with a lower end of the above-indicated one primary line. Where the secondary recording operation is effected with two or more secondary lines recorded after the primary recording operation, the recording of the last secondary line is effected while the lower edges of the heat-generating elements are substantially aligned with the lower end of the above-indicated one primary line.

The time period during which the heat-generating elements are selectively energized for the secondary recording operation may be made suitably shorter than that for the primary recording operation.

In another arrangement of the second form of the invention, the heat-generating elements are arranged in a straight row so as to cover an effective recording width of the recording medium, in the direction perpendicular to the feeding direction of the medium.

It is a further object of the present invention to provide a recording apparatus having a linear array of dot-forming elements, which apparatus permits a high degree of continuity of images having curved and/or inclined lines or portions, while assuring squareness or sharpness of rectangular corner portions or crisscrossing portions of the images.

The above object may be achieved according to the principle of another aspect of the present invention, which provides a recording apparatus for recording images such as characters and graphical representations on a recording medium, according to sets of line data indicative of presence or absence of dots in respective recording lines, comprising: (a) data processing means for preparing a set of smoothing line data representative of a smoothing line, based on a first set of line data representative of a line $N_i$ (i: natural number) and a second set of line data representative of a line $N_{i+1}$, such that the smoothing line improves accuracy of reproduction of original images on the recording medium, by connecting dots of the two lines $N_i$ and $N_{i+1}$ by dots of the smoothing line; (b) and recording means for recording the smoothing line between the two lines $N_i$ and $N_{i+1}$.

In the recording apparatus constructed as described above, the set of smoothing line data is prepared depending upon the first and second sets of line data for the adjacent two lines $N_i$ and $N_{i+1}$ between which the smoothing line according to the smoothing line data is inserted. The dot pattern of the smoothing line is not necessarily the same as the dot pattern of the preceding line $N_i$, but is formulated such that the dots of the smoothing line improve the continuity of the curved and/or inclined portions of the images, while maintaining the squareness or sharpness of the rectangular corner portions or crisscrossing portions of the images. In other words, the smoothing line data is prepared so as to provide an optimum compromise between the continuity of images at the curved or inclined portions, and the squareness or sharpness of the rectangular corner or crisscrossing portions of the images, as is apparent from the following description.

In one form of the above aspect of the present invention, the data processing means determines a processing range of the first and second sets of line data, in which either and only one of each pair of bits of the first and second sets of line data which correspond to each other in a direction of the two lines $N_i$ and $N_{i+1}$ is indicative of the presence of a dot. Further, the data processing means effects a first determination as to whether or not all of the bits in the processing range of one of the first and second sets of line data are indicative of the presence of dots while all of the bits in the processing range of the other set are indicative of the absence of dots, and effects a second determination as to whether a bit of the other set of line data which is adjacent to one of opposite ends of the processing range outwardly of the processing range is indicative of the presence of a dot, while a bit of the above-indicated one set of line data which is adjacent to the other end of the processing range outwardly of the processing range is indicative of the absence of a dot. When the first and second determinations are affirmative, the data processing means prepares the set of smoothing line data such that successive bits of the smoothing line data from a position corresponding to the bit adjacent to the above-indicated one end of the processing range to an intermediate position of the processing range are indicative of dots.

In one arrangement of the above form of the invention, the data processing means prepares the set of smoothing line data such that the bits of the smoothing line data corresponding to the bits in the processing range of the first and second sets of line data are the same as the corresponding bits of the first set of line data, if the processing range of the first set of line data consists of at least one bit indicative of the presence of a dot and at least one bit indicative of the absence of a dot.

In another arrangement of the above form of the invention, the data processing means prepares the set of smoothing line data such that the bits of the smoothing line data corresponding to the bits in the processing range of the first and second sets of line data are all indicative of the absence of dots, if all of the bits in the processing range of the first set of line data are indicative of the absence of dots while all of the bits in the processing range of the second set of line data are indicative of the presence of dots, and if bits of the first set of line data which are adjacent to the opposite ends of the processing range outwardly of the processing range are both indicative of the absence of dots.

In another form of the apparatus according to the above aspect of the invention, the data processing means determines a processing range of the first and second sets of line data, in which either and only one of each pair of bits of the first and second sets of line data which correspond to each other in a direction of the two lines $N_i$ and $N_{i+1}$ is indicative of the presence of a dot. Further, the data processing means effects a first determination as to whether or not all of the bits in the processing range of the first set of line data are indicative of the absence of dots while all of the bits in the processing range of the second set of line data are indicative of the presence of dots, and effects a second determination as to whether bits of the first set of line data which are adjacent to opposite ends of the processing range outwardly of the processing range are both indicative of the presence of dots. When the first and second determinations are affirmative, the data processing means prepares the set of smoothing line data such that two groups of successive bits of the smoothing line data from respective positions corresponding to the bits adjacent to the opposite ends of the processing range to a position before a middle position of the processing range are indicative of the presence of dots.

In the above arrangement, the data processing means may be adapted to prepare the set of smoothing line data such that the bits of the smoothing line data corresponding to the bits in the processing range of the first set of line data are the same as the corresponding bits of the first set of line data, if the number of the bits of the processing range is smaller than a predetermined value. The data processing means may be further adapted to prepare the set of smoothing line data such that the bits of the smoothing line data corresponding to the bits in the processing range of the first and second set of line data are indicative of the presence of dots, if all of the bits in the processing range of the first set of line data are indicative of the presence of dots while all of the bits in the processing range of the second set of line data are indicative of the absence of dots.

In a further form of the apparatus, the data processing means determines a processing range of the first and second sets of line data, in which either and only one of each pair of bits of the first and second sets of line data which correspond to each other in a direction of the two lines $N_i$ and $N_{i+1}$ is indicative of the presence of a dot. Further, the data processing means effects a first determination as to whether or not all of the bits in the processing range of the first set of line data are indicative of the presence of dots while all of the bits in the processing range of the second set of line data are indicative of the absence of dots, and effects a second determination as to whether bits of the second set of line data which are adjacent to opposite ends of the processing range outwardly of the processing range are both indicative of the absence of dots. When the first and second determinations are affirmative, the data processing means prepares the set of smoothing line data such that successive bits of the smoothing line data corresponding to an intermediate area of the processing range whose opposite ends are spaced apart from the opposite ends of the processing range are indicative of the presence of dots.

In a still further form of the apparatus according to the same aspect of the invention, each bit of the first and second sets of line data is indicative of the presence of a dot when a logical value of the bit is "1" while the bit is indicative of the absence of a dot when the logical value is "0". The data processing means determines a processing range of the first and second sets of line data, in which a logical value of an exclusive-or operation in connection with the corresponding bits of the first and second sets of line data is "1". The data processing means prepares the set of smoothing line data, such that logical values of the bits of the smoothing line data corresponding to the bits in the processing range of the first and second sets of line data are determined depending upon the logical values of the corresponding bits of the first and second sets of line data. In this case, the data processing means may be adapted to prepare the set of smoothing line data selectively in four different manners which are selected according to respective four combinations of two logical values (1, 1), (0, 1), (1, 0) and (0, 0) of respective "and" operations or logical products in connection of two pairs of bits of the first and second sets of line data which are adjacent to opposite ends of the processing range outwardly of the processing range.

According to a further aspect of the present invention, there is provided a recording apparatus for recording images on a planar recording medium, comprising: (a) a thermal print head having a plurality of heat-generating elements arranged in a straight row, for recording dots in a recording line parallel to the straight row, each of the heat-generating elements having an effective recording length smaller than a thickness of the recording line in a feeding direction of the recording medium perpendicular to the straight row; (b) medium support means for supporting the recording medium such that the thermal print head faces a surface of the recording medium; (c) feeding means for feeding the recording medium and the thermal print head relative to each other in the feeding direction; and (d) control means for selectively energizing the heat-generating elements such that upper edges of the heat-generating elements are substantially aligned with an upper end of the recording line, and controls the feeding means to feed the recording medium and the print head relative to each other in the feeding direction by a predetermined distance after energization of the heat-generating elements, until lower edges of the heat-generating elements are substantially aligned with a lower end of the recording line. After the recording medium and the print head have been fed relative to each other by the predetermined distance, the control means energizes the heat-generating elements which have been energized with the upper edges substantially aligned with the upper end of the recording line.

BRIEF DESCRIPTION OF THE DRAWINGS

The foregoing and other objects, features and advantages of the present invention will be better understood by reading the following detailed description of presently preferred embodiments of the invention, when considered in conjunction with the accompanying drawings, in which:

FIG. 2 is a diagram showing a gate circuit for activating a thermal print head of the recording apparatus of FIG. 1;

FIG. 5 and FIGS. 7A–7D are flow charts illustrating an operation of the apparatus according to one embodiment of the invention;

FIGS. 6A, 6B, 13A–D, 14A–D, 15A–D and 16A–C are illustrations indicating various states in which recording is effected with a smoothing line interposed between two adjacent data lines; FIGS. 6A, 13A-1, 13B-1, 13C-1, 14A-1, 14C-1, 14D-1, 15A-1, 15B-1, 15C-1, 15D-1, 16A-1, 16B-1 and 16C-1 show conventional recording methods.

FIGS. 8A–D are views explaining four different modes in which in-process data X' is prepared to prepare smoothing line data S for the smoothing line;

FIGS. 9A–D, 10A–D, 11A–D and 12A–C are illustrations showing processes in which the smoothing line data S is prepared;

FIG. 18 is a view illustrating a supplemental recording which is effected following a primary recording of each line, according to the embodiment of FIG. 17.

DETAILED DESCRIPTION OF THE PREFERRED EMBODIMENTS

Figure 1:
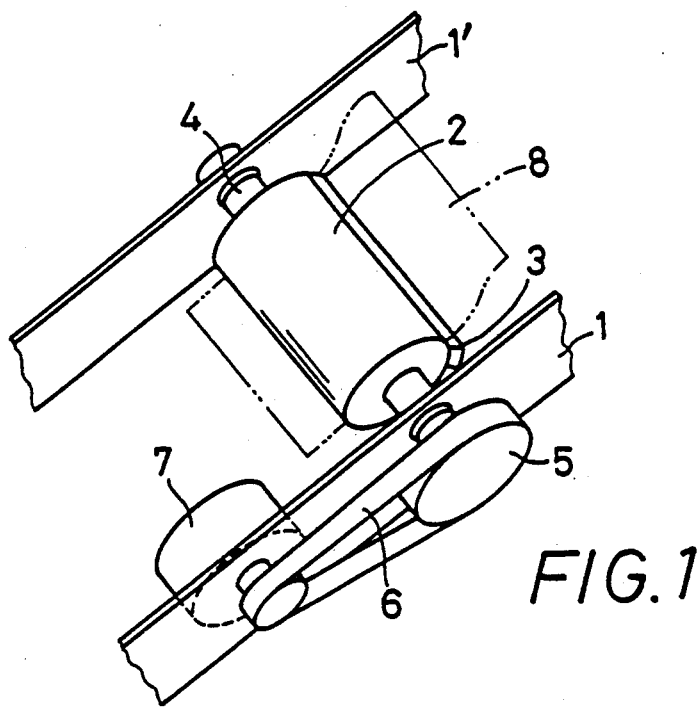
FIG. 1 is a schematic fragmentary view in perspective of one form of a recording apparatus of the present invention.

Referring first to FIG. 1, there is shown a thermal recording apparatus, wherein a platen shaft 4 is rotatably supported by a pair of opposed side frames 1, 1'. The platen shaft 4 bears a cylindrical platen 2 fixed thereto. The recording apparatus has an elongate thermal print head 3 which extends parallel to the platent shaft 4 such that the print head 3 faces the circumferential surface of the platen 2.

The platent shaft 4 has a platen drive wheel 5 removably fixed to its one end. The drive wheel 5 is connected by a belt 6 to a platen drive stepping motor 7 attached to the side frame 1, so that the drive wheel 5 and the platen 2 are rotated by the stepping motor 7.

The apparatus is adapted such that a recording medium in the form of a heat-sensitive paper 8 is passed between the circumferential surface of the platen 2 and the thermal print head 3. With the platen 2 rotated by the stepping motor 7, the paper 8 is fed in a feeding direction perpendicular to the axis of rotation of the platen shaft 4 (platen 2).

Figures 1, 13A:
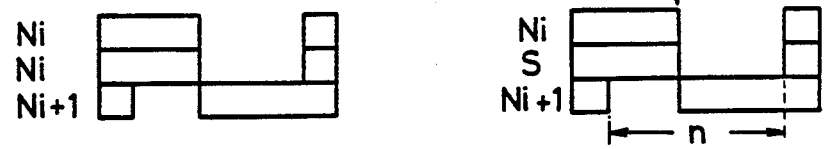
Figures 1, 13B:
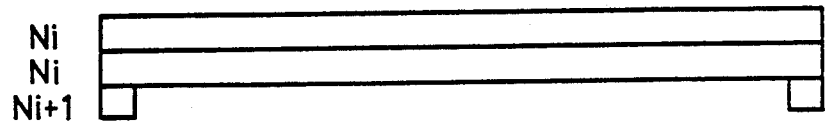
Figures 1, 13C:
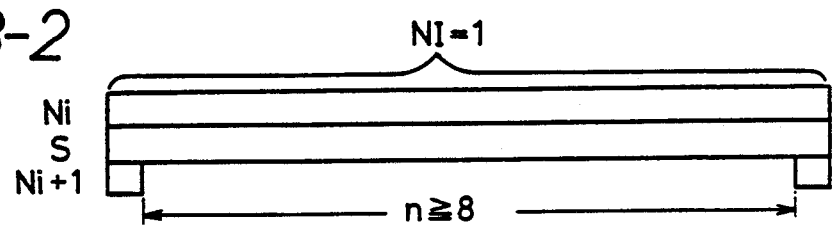
Figures 1, 13D:
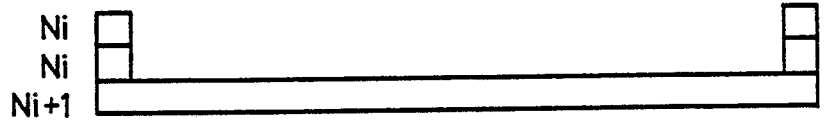
Figures 2, 13D:
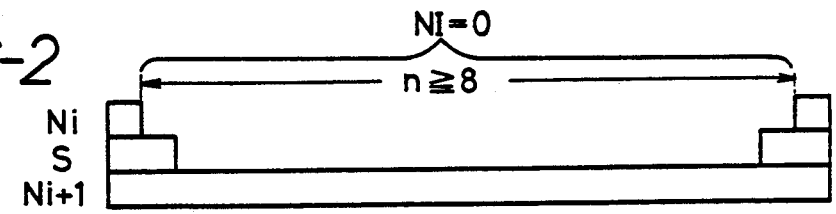
Figures 1, 14A:
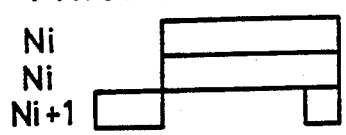
Figures 2, 14A:
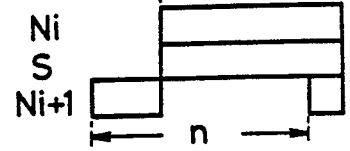
Figures 1, 14B:
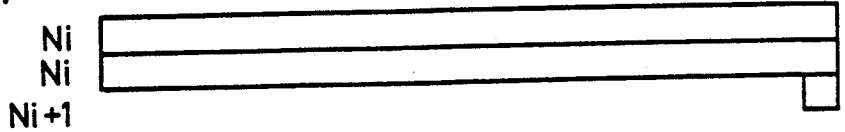
Figures 2, 14B:
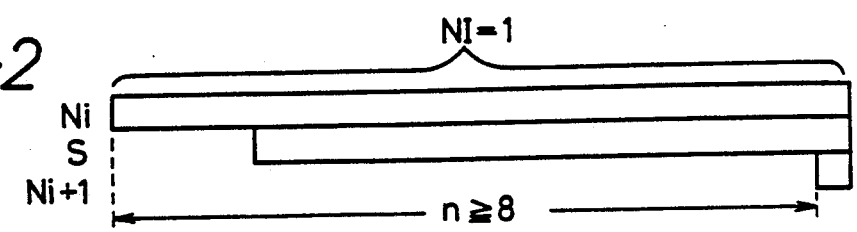
Figures 1, 14C:
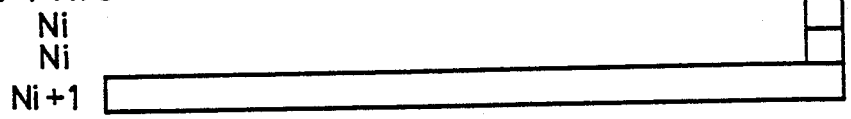
Figures 2, 14C:
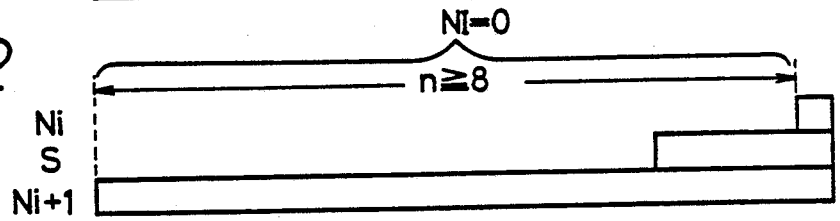
Figures 1, 14D:
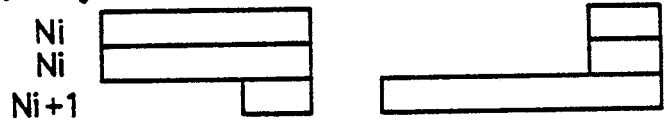
Figures 2, 14D:
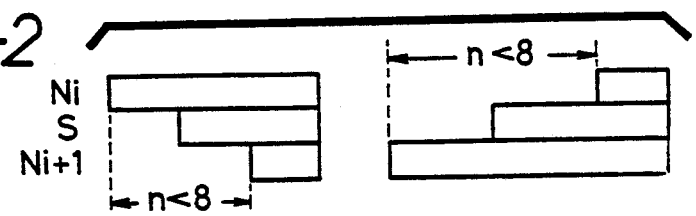
Figures 1, 16A:
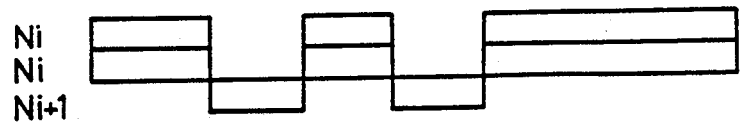
Figures 2, 16A:
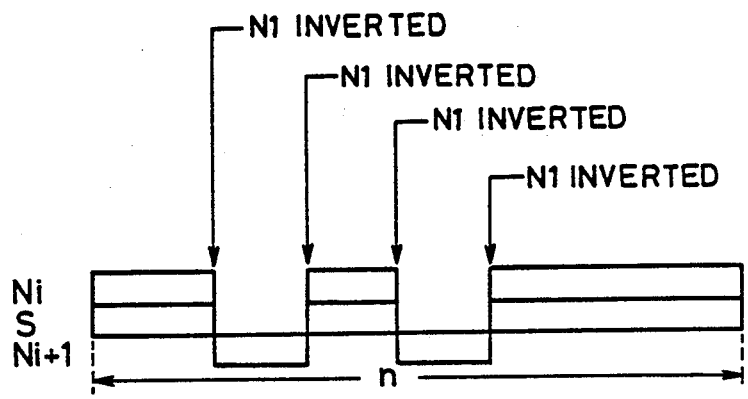
Figures 1, 16B:
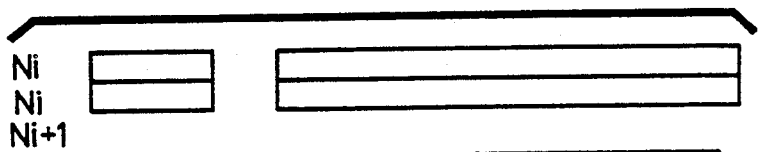
Figures 2, 16B:
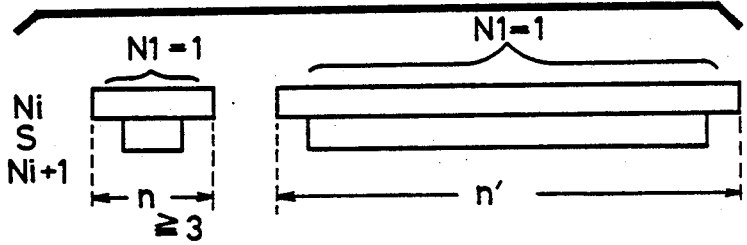
Figures 1, 16C:
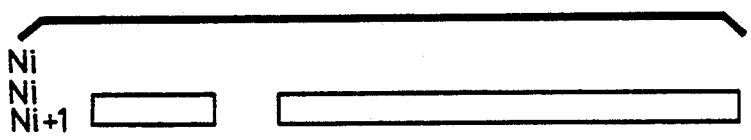
Figures 2, 16C:
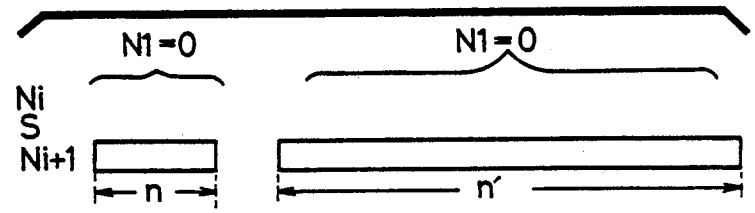

The thermal print head 3 has an array of heat-generating elements 10 which are equally spaced from each other in the direction parallel to the platen shaft 4, at a predetermined pitch which determines the resolution of images to be recorded. Namely, the heat-generating elements 10 correspond to printing dots that are formed in a line on the paper 8. These heat-generating elements 10 of the print head 3 are selectively energized according to line data, by means of a gate circuit indicated at 11 in FIG. 2. The gate circuit 11 consists of a plurality of blocks, for example, eight blocks as indicated in FIG. 2, and are connected to a block control circuit 21 and a data latch circuit 22, so that the gates of each block of the gate circuit 11 are controlled (opened and closed) according to strobe signals from the block control circuit 21 and the line data supplied from the data latch circuit 22. That is, the heat-generating elements 10 are selectively energized or deenergized depending upon the output potentials of the corresponding gates of the gate circuit 11, so that dots are formed on the paper 8 by the energized heat-generating elements 10.

The recording apparatus employs a control device in the form of a microcomputer 26 which includes a central processing unit (CPU) 23, and a read-only memory (ROM) 24 and a random-access memory (RAM) 25 which are connected to the CPU 23. The ROM 24 stores various control programs including a control routine for preparing smoothing line data S (which will be described) as illustrated in FIGS. 7A–7D. Line data representative of information to be recorded on the paper 8 is received by the CPU 23, which temporarily stores the line data in the RAM 215 and applies the line data to the data latch circuit 22, so that the line data is latched in the circuit 22. At the same time, the CPU 23 controls the block control circuit 21 to sequentially apply high-potential strobe pulses to each block of the gate control 11, so that the heat-generating elements 10 connected to the gates of the circuit 11 which receive line data bits whose logical values are "1" are energized to form dots in a line represented by a set of line data.

The control system of the recording apparatus further includes a driver circuit 27 for driving the stepping motor 7 for rotating the platen 2, i.e., for feeding the heat-sensitive paper 8. Upon completion of recording of each one line, the CPU 23 commands the motor driver circuit 27 to apply a signal to the stepping motor 7, so that the stepping motor 7 is activated in a stepping fashion, to effect an incremental line feeding of the paper 8 in the feeding direction, prior to recording the following line is.

As suggested above, the ROM 24 stores the control program executed to prepare smoothing line data representative of a smoothing line to be interposed between two adjacent lines, when the control device is placed in a STANDARD RESOLUTION mode as distinguished from a HIGH RESOLUTION mode. On the other hand, the RAM 25 is provided to temporarily store various in-process data, so that the CPU 23 cooperates with the ROM 24 and the RAM 25 to perform various functions to control the operations of the recording apparatus.

Figure 4:
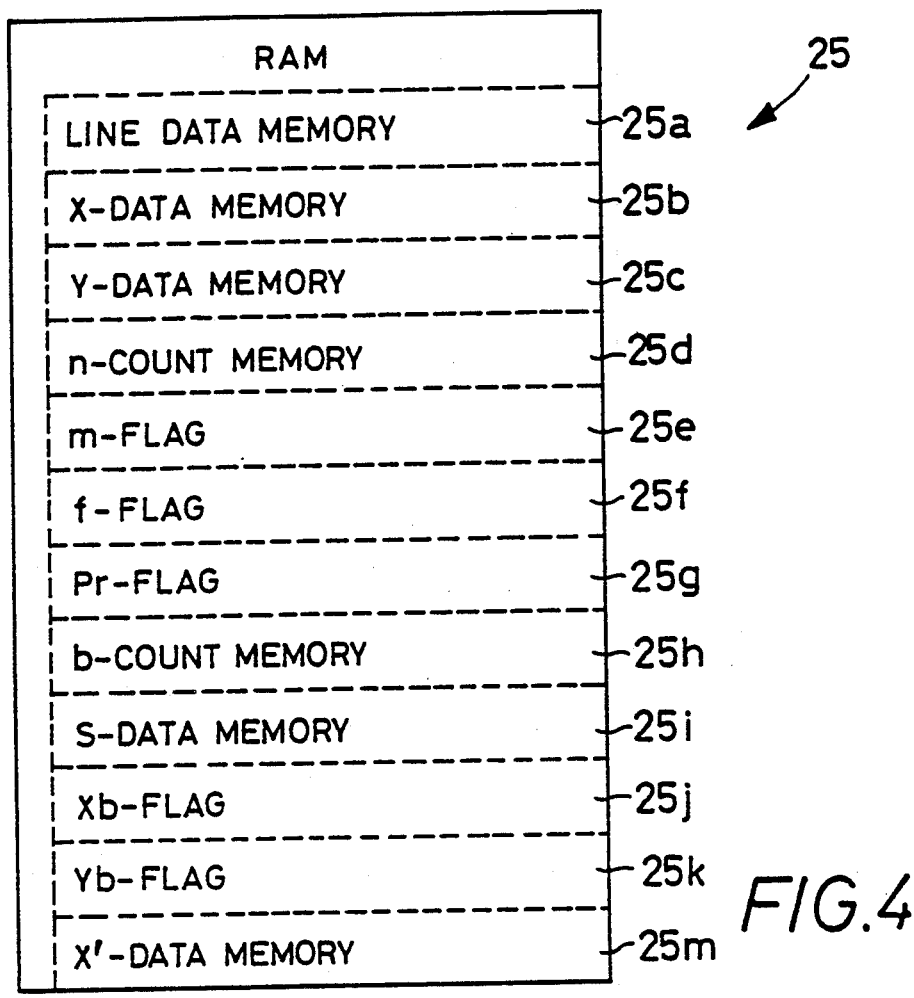
FIG. 4 is a view showing in detail a random-access memory incorporated in the control system of FIG. 3.

As indicated in FIG. 4, the RAM 25 includes:

(a) LINE DATA memory 25a for receiving from the CPU 23 a set of line data ($N_i$ line data) representative of a line $N_i$, and a set of line data ($N_{i+1}$ line data) representative of a line $N_{i+1}$ following the line $N_i$;

(b) X-DATA memory 25b for storing X data representative of logical values X obtained as a result of exclusive-or operations in connection with the $N_i$ line data and the $N_{i+1}$ line data;

(c) Y-DATA memory 25c for storing Y data representative of logical values (logical product) Y obtained as a result of AND operations in connection with the $N_i$ line data and the $N_{i+1}$ line data;

(d) n-count memory 25d for storing data representative of the number "n" of successive bits "1" of the X data (the number "n" determining a "processing range" which will be described);

(e) m-flag 25e for storing data indicative of a logical value "m" of a bit of the X data;

(f) f-flag 25f for storing data indicative of the inversion of the logical value "f" of the $N_i$ line data at a given bit position;

(g) Pr-flag 25g for storing data indicative of a logical value "Pr" of a bit of the Y data which immediately precedes the bit of the X data at which counting of the number "n" of the successive X data bits "1" is commenced;

(h) b-count memory 25h for storing data indicative of the number "b" of the current bit of the $N_i$ line data, at which the relevant data processing is executed, ($1 \leq b \leq$ the total number of the bits of the $N_i$ line data);

(i) S-DATA memory 25i for storing the smoothing line data S representative of a smoothing line between the adjacent lines $N_i$ and $N_{i+1}$;

(j) Xb-flag 25j for storing data indicative of a logical value "Xb" of a bit of the X data;

(k) Yb-flag 25k for storing data indicative of a logical value "Yb" of a bit of the Y data; and (l) X'-DATA memory 25m for storing X' data which is used to prepare the smoothing line data S, as described below in greater detail.

The recording operation of the present recording apparatus will be described, by reference to the flow charts of FIG. 5 and FIGS. 7A-7D.

Upon reception of a batch of line data by the CPU 23 of the microcomputer 26, the CPU 23 first executes step S1 to determine whether or not the control is placed in the STANDARD RESOLUTION mode in which a smoothing line follows each line of information represented by a set of line data. If the control is not placed in the STANDARD RESOLUTION mode, this means that the control is placed in the HIGH RESOLUTION mode in which each line $N_i$ is recorded according to a corresponding each set of line data received by the CPU 23. In this case, the control flow goes to step S9, in which the line data for each line is transferred from the LINE DATA memory 25a to the data latch circuit 22, while the strobe signals are generated from the clock control circuit 21, so that the heat-generating elements 10 of the thermal print head 2 are selectively energized to print dots in a line on the heat-sensitive paper 8, according to the set of line data from the data latch circuit 22. Then, the paper 8 is fed in the feeding direction by a predetermined incremental distance, and the next line $N_{i+1}$ is recorded in the same manner as described above.

If an affirmative decision (YES) is obtained in step S1, that is, if the STANDARD RESOLUTION mode is selected, the control flow goes to step S2, in which sets of line data for two successive lines $N_i$ and $N_{i+1}$ (i.e., $N_i$ and $N_{i+1}$ line data) stored in the LINE DATA memory 25a are latched in the data latch circuit 22. Step S2 is followed by step S3 in which the strobe signals are sequentially supplied from the block control circuit 21 to the gate circuit 11, whereby the heat-generating elements 10 are selectively energized depending upon the output potentials of the corresponding gates of the gate circuit 11, which are controlled by the set of $N_i$ line data latched in the data latch memory 22. Consequently, the dots corresponding to the energized heat-generating elements 10 are formed in a line on the heat-sensitive paper 8. Thus, the line $N_i$ is recorded according to the $N_i$ line data.

Step S3 is followed by step S4 in which the driver circuit 27 applies a drive signal to the stepping motor 7, so as to rotate the platen 2 for feeding the paper 8 by the predetermined incremental distance. Subsequently, step S5 is executed to effect a control routine of FIGS. 7A-7D for preparing smoothing line data S for a smoothing line following the $N_i$ line, based on the $N_i$ line data and $N_{i+1}$ line data which are stored in the LINE DATA memory 25a of the RAM 25. This control routine will be described below in greater detail. Step S5 is followed by step S6 to apply the prepared smoothing line data S to the data latch circuit 22. Then, step S7 is implemented to form dots as the smoothing line on the paper 8 according to the smoothing line data, in the same manner as in step S3. Then, step S8 is implemented to feed the paper 8 by the incremental distance.

Figure 6A:
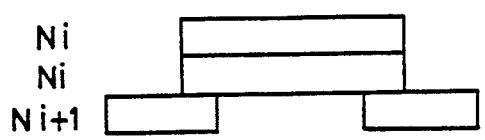
Figure 6B:
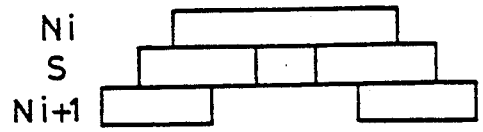
Figure 7A:
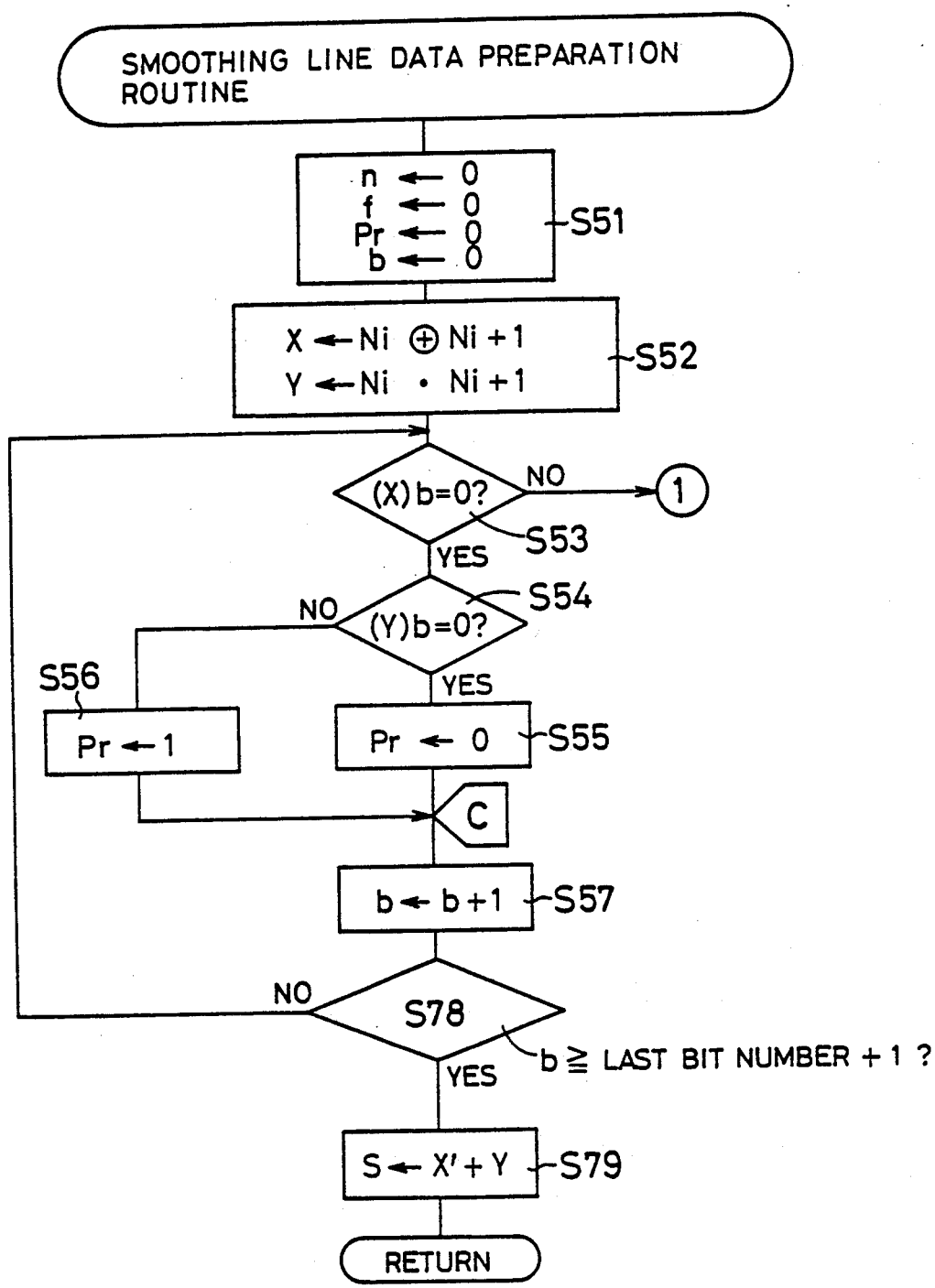
Figure 7B:
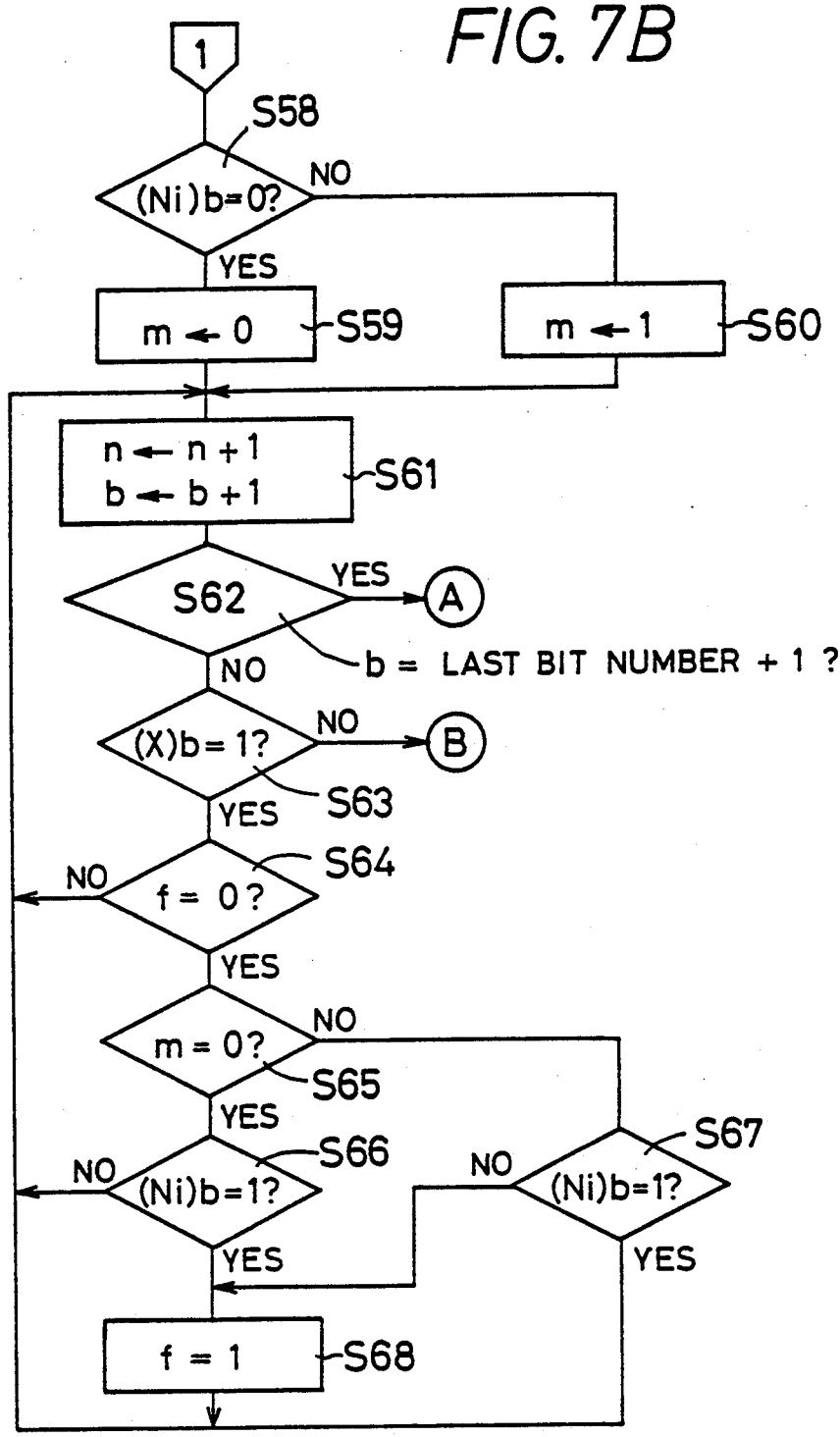

Then, the control flow returns to step S1, and to S2 to apply the $N_{1+1}$ line data to the data latch circuit 22, and the line $N_{1+1}$ is recorded in step S3. Thus, the line $N_i$, smoothing line and line $N_{i+1}$ are recorded as indicated in FIG. 6B. While the smoothing line is recorded following the line $N_i$ according to the smoothing line data S in the present embodiment, two same lines $N_i$ are recorded according to the same line data according to the conventional method as indicated in FIG. 6A. In other words, a line identical to the preceding line is interposed between the preceding line $N_i$ and the following line $N_{i+1}$ in the conventional arrangement.

The smoothing data preparation control routine of FIGS. 7A-7D will be described.

Initially, step S51 is implemented to initialize the control device, i.e., to reset the n-count memory 25c, f-flag 25f, Pr-flag 25g and b-count memory 25h of the RAM 25. Then, the control flow goes to step S52 in which the X data corresponding to the $N_i$ and $N_{1+1}$ line data is prepared. Namely, the logical values X of the X data bits are calculated by EXCLUSIVE-OR operations of the local values of the corresponding bits of the $N_i$ line data and the $N_{i+1}$ line data. The calculated X data is stored in the X-DATA memory 25b. Further, the logical values Y of the Y data bits are calculated by AND operations of the local values of the corresponding bits of the $N_i$ line data and the $N_{i+1}$ line data. The calculated Y data is stored in the Y-DATA memory 25c.

Step S52 is followed by step S53 to determine whether the logical value "Xb" of the current bit "b" of the X data is "0" or not. If an affirmative decision (YES) is obtained in step S53, the control flow goes to step S54 to determine whether the logical value "Yb" of the current bit "b" of the Y data is "0" or not. If an affirmative decision (YES) is obtained in step S54, step S55 is implemented to reset the Pr-flag 25g. If the logical value "Yb" is "1" or a negative decision (NO) is obtained in step S54, step S56 is implemented to set the Pr-flag 25g to "1". Steps S55 and S56 are followed by step S57 in which the b-count memory 25h is incremented. Then, step S78 is executed to check if the number "b" represented by the data stored in the b-count memory 25h has exceeded the number "b" of the last bit of the $N_i$ and $N_{i+1}$ line data (X data). Steps S53–S57 and S78 are repeatedly executed until an affirmative decision (YES) is obtained in step S78. It will be understood therefore that steps S53–S57 and S78 are executed to find a bit of the X data whose logical value is "0" and which precedes a first bit whose logical value is "1", and to set the Pr-flag 25g depending upon the logical value "Yb" of the corresponding bit of the Y data.

If step S53 reveals that the logical value "Xb" is "1", or if a negative decision (NO) is obtained in step S53, the control flow goes to step S58 (FIG. 7B) to determine whether the logical value "($N_i$)b" of the bit "b" of the $N_i$ line data is "0" or not. If an affirmative decision (YES) is obtained in step S58, step S59 is executed to reset the m-flag 25e. If a negative decision (NO) is obtained in step S58, step S60 is executed to set the m-flag 25e to "1". It will be understood that steps S58–S60 are implemented when a bit "0" of the X data is replaced by a bit "1" of the X data, that is, when the logical value of the X data is changed from "0" to "1". Therefore, the content of the m-flag 25e which is set or reset in steps S59 and S60 represents the logical value of the bit of the $N_i$ line data which corresponds to the bit of the X data whose logical value is "1" and which follows the preceding bit whose logical value is "0".

Steps S59 and S60 are followed by step S61 in which the n-count memory 25d and the b-count memory 25h are both incremented. Then, the control flow goes to step S62 to determine whether the number "b" stored in the b-count memory 25h has exceeded the number "b" of the last bit of the $N_i$ line data. If a negative decision (NO) is obtained in step S62, the control flow goes to step S63 to determine whether the logical value "Xb" of the X data is "1" or not. If an affirmative decision (YES) is obtained in step S63, step S64 is executed to determine whether the f-flag 25f is in the reset state "0" or not. It will be understood that steps S61 and S63 are provided to find a bit of the X data whose logical value is "1" and which precedes the preceding bit whose logical value is "0".

If the content of the f-flag 25f is "1", that is, if the f-flag 25f is in the set state in step S64, the control flow returns to step S61. If the content of the f-flag 25f is "0", step S64 is followed by step S65 to determine whether the content of the m-flag 25e is "0" (i.e., whether the m-flag 25e is in the reset state), or not. Step S65 is followed by step S66 or S67 to determine whether the logical value of the bit "b" of the $N_i$ line data is "1" or not. If the logical value of the m-flag 25e is "0" while the logical value of the bit "b" of the $N_i$ line data is "1", the f-flag 25f is set to "1" in step S68, and the control flow goes back to step S61. If the logical value of the m-flag 25e is "1" while the logical value of the bit "b" of the $N_i$ line data is "0", step S68 is also executed to set the f-flag 25f to "1" before the control flow returns to step S61. If the logical value of the m-flag 25e is "1" while the logical value of the bit "b" is "1", step S68 is not executed and the control flow goes directly back to step S61.

It will be understood from the above that steps S63–S68 are provided to check if the logical value of a bit of the $N_i$ line data is inverted with respect to that of the preceding bit, or not, by comparing the logical value of the bit "b" of the $N_i$ line data with the present state of the m-flag 25e. If the states of the m-flag 25e and the bit "b" do not accord with each other, step S68 is implemented to set the f-flag 25f to "1".

If step S62 reveals that the content of the b-count memory 25h is equal to the number "b" of the last bit of the $N_i$ line data plus "1" ("b"+"1"), the control flow goes to step S71 (FIG. 7C) to determine whether the content of the Pr-flag 25g is "0" or not.

In the above case, step S69 (described below) to check the logical value of the bit "b" of the Y data (result of the AND operation of the $N_i$ and $N_{i+1}$ line data) is not executed, since it is known that the logical value of the bit ("b"+"1") of the Y data is "0" when the logical value of the bit "b" of the X data corresponding to the last bit "b" of the $N_i$ line data is "1".

If step S63 reveals that the logical value of the bit "b" of the X data is "0", the control flow goes to step S69 (FIG. 7C) to determine whether the logical value of the bit "b" of the Y data is "1" or not. If an affirmative decision (YES) is obtained in step S69, step S70 is implemented to determine whether the content of the Pr-flag 25g is "0" or not. If a negative decision (NO) is obtained in step S69, the above-indicated step S71 is executed to determine whether the content of the Pr-flag 25g is "0" or not.

Steps S70 and S71 are followed by step S72 in which X' data is prepared for a range of the X data consisting of the successive bits whose logical values are all "1". This range will be referred to as "processing range" consisting of the successive bits "1" the total number of which is equal to "n". The manner in which the X' data (used to prepare the smoothing line data S which will be described) is prepared differs depending upon the state of the Pr-flag 25g which represents the logical value of a bit of the Y data which immediately precedes the processing range of the X data (the first bit of the processing range), and depending upon the logical value of the bit of the Y data which follows the processing range of the X data (last bit of the processing range).

Referring to FIG. 7D and FIGS. 8A, 8B, 8C and 8D, four different modes of preparing the X' data will be described. These four modes are performed in respective sub-steps S721, S722, S723 and S724 of Step S72, according to four different cases "1"-"1", "0"-"1", "1"-"0" and "0"-"0" depending upon the determinations in Steps S70 and S71. More specifically, the first case "1"-"1" to execute sub-step S721 is established if a negative decision (NO) is obtained in step S70, namely, where the logical value of the bit of the Y data which immediately precedes the first bit "1" in the processing range of the X data is "1" (where the content of the Pr-flag 25g is "1"), and where the logical value (Y)b of the bit of the Y data which immediately follows the last bit "1" in the processing range of the X data is also "1". This case "1"-"1" is schematically illustrated in FIG. 8A.

The second case "0"-"1" to execute sub-step S722 is established if an affirmative decision (YES) is obtained in step S70, namely, where the content (Pr) of the Pr-flag 25g is "0" while the logical value (Y)b of the bit of the Y data which immediately follows the last bit "1" in the processing range of the X data is also "1". This case "0"-"1" is illustrated in FIG. 8B.

The third case "1"-"0" to execute sub-step S723 is established if a negative decision (NO) is obtained in step S71, namely, where the content (Pr) of the Pr-flag 25g is "1" while the logical value (Y)b of the bit of the Y data which follows the last bit "1" in the processing range of the X data is "0". This case "1"-"0" is illustrated in FIG. 8C.

The fourth case "0"-"0" to execute sub-step S724 is established if an affirmative decision (YES) is obtained in step S71, namely, where the content (Pr) of the Pr-flag 25g is "0" while the logical value (Y)b of the bit of the Y data which follows the last bit "1" in the processing range of the X data is "0". This case is illustrated in FIG. 8D.

The sub-steps S721, S722, S723 and S724 which will be described later in detail are followed by steps S73, S74, S75 and S76, respectively as indicated in FIG. 7F. In steps S73 and S74, the Pr-flag 25g is set to "1". In steps S75 and S76, the Pr-flag 25g is reset to "0". Thus, the Pr-flag 25g whose content has been checked in steps S70 and S71 are updated in steps S73–S76, according to the logical value (Y)b of the bit of the Y data following the last bit in the processing range of the X data.

Steps S73–S76 are followed by step S77 wherein the m-flag 25e and the f-flag 25f are both reset to "0". Then, the control flow goes back to step S57 to increment the b-count memory 25h.

If step S78 reveals that the number "b" stored in the b-count memory 25h has become equal to the number "b" of the last bit of the X data plus "1" (b"+"1"), that is, steps S51-S78 have been executed for all the bits "b" of the $N_i$ line data, step S79 is implemented to prepare the above-indicated smoothing line data S, which consists of bits whose logical values are determined as a result of INCLUSIVE-OR operations in connection with the Y data, and the X' data prepared in sub-steps S721-S724. The smoothing line data S will be used to record a smoothing line following the line $N_i$, before the next line $N_{1+1}$ is recorded.

The manner of preparing the X' data in sub-step S721 in the first case "1"-"1" will be described, by reference to FIGS. 9A-9D. In this case, the logical values (Pr) and (Y)b of the bits of the Y data which precede and follow the processing range of the X data (indicated in FIGS. 9A-9D, at "n" which represents the number of the successive bits "1") are both "1".
(i) Where the content of the f-flag 25f is "1", namely, where there exists at least one occurrence of inversion of the logical values of the $N_i$ line data within the processing range of the X data, the X' data is prepared such that the logical values of the X' data bits are identical with those of the corresponding bits of the $N_i$ line data, as indicated in FIG. 9A. Consequently, the smoothing line data S is the same as the $N_i$ line data, whereby the line $N_i$ and the smoothing line are recorded according to the $N_i$ line data, before the line $N_{1+1}$ is recorded.
(ii) Where the number "n" of the successive bits "1" in the processing range of the X data is equal to or larger than "8" while the logical values of the $N_i$ line data bits corresponding to the processing range of the X data are all "1" (the content of the m-flag 25e is "1"), the X' data is the same as the $N_i$ line data, as indicated in FIG. 9B. In this case, there exists no occurrence of inversion of the logical values of the $N_i$ line data. Therefore, the smoothing line data S is the same as the $N_i$ line data. Where the number "n" of the successive bits "1" in the processing range of the X data is equal to or larger than "8" while the logical values of the $N_i$ line data bits corresponding to the processing range of the X data are all "0" (the content of the m-flag 25e is "0"), the X' data is prepared such that the logical values of only the X' data bits corresponding to the first and last bits in the processing range of the X data are "1", as indicated in FIG. 9C. Consequently, the smoothing line data S is prepared as indicated in FIG. 9C.
(iii) Where the number "n" of the successive bits "1" in the processing range of the X data is smaller than "8" while there arises no occurrence of inversion of the logical values of the $N_i$ line data (the content of the f-flag 25f is "0"), the X' data is the same as the $N_i$ line data, and the smoothing line data S is prepared as indicated in FIG. 9D.

Then, the manner of preparing the X' data in sub-step S722 in the second case "0"-"1" will be described, by reference to FIGS. 10A-10D. In this case, the logical value (Pr) of the bit of the Y data which precedes the processing range of the X data is "0" while the logical value (Y)b of the Y data bit which follows the processing range of the X data is "1".
(i) Where there exists at least one occurrence of inversion of the logical values of the $N_i$ line data within the processing range of the X data (where the content of the f-flag 25f is "1"), the X' data is prepared such that the X' data is the same as the $N_i$ line data, as indicated in FIG. 10A. Consequently, the smoothing line data S is the same as the $N_i$ line data.
(ii) Where the number "n" of the successive bits "1" in the processing range of the X data is equal to or larger than "8" while the logical values of the $N_i$ line data bits corresponding to the processing range of the X data are all "1" (the content of the m-flag 25e is "1"), the X' data is prepared such that the logical values of the X' data bits corresponding to the first four bits in the processing range of the X data are "0", as indicated in FIG. 10B. Therefore, the smoothing line data S is prepared as indicated in FIG. 10B. Where the number "n" of the successive bits "1" in the processing range of the X data is equal to or larger than "8" while the logical values of the $N_i$ line data bits corresponding to the processing range of the X data are all "0" (the content of the m-flag 25e is "0"), the X' data is prepared such that the logical values of only the X' data bits corresponding to the last four bits in the processing range of the X data are "1", as indicated in FIG. 10C. Consequently, the smoothing line data S is prepared as indicated in FIG. 10C.

(iii) Where the number "n" of the successive bits "1" in the processing range of the X data is smaller than "8" while there arises no occurrence of inversion of the logical values of the $N_i$ line data (the content of the f-flag 25f is "0"), the X' data is prepared such that the logical values of the X' data bits corresponding to the first half (left half in FIG. 10D) of the processing range of the X data area "0" while the logical values of the X' data bits corresponding to the second or right half of the processing range of the X data are "1", as indicated in FIG. 10D. In this case, the smoothing line data S is prepared as indicated in FIG. 10D.

Referring to FIGS. 11A–11D, there will be described the manner of preparing the X' data in sub-step S723 in the third case "1"-"0". In this case, the logical value (Pr) of the bit of the Y data which precedes the processing range of the X data is "1" while the logical value Y(b) of the Y data bit which follows the processing range of the X data is "0".

Figure 11A:
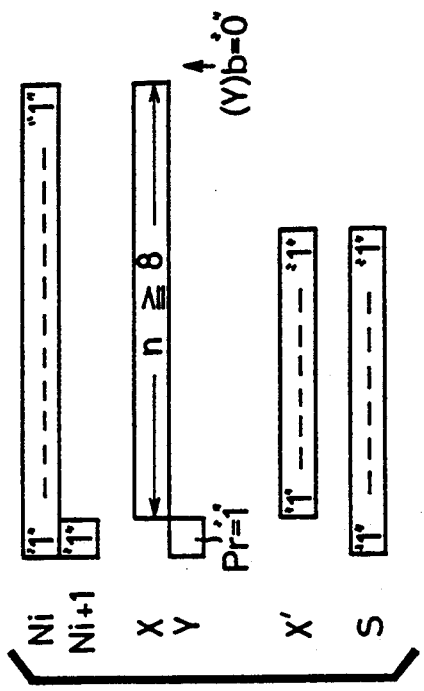

(i) Where there exists at least one occurrence of inversion of the logical values of the $N_i$ line data within the processing range of the X data (where the content of the f-flag 25f is "1"), the X' data is prepared such that the X' data is the same as the $N_i$ line data, and the smoothing line data is the same as the $N_i$ line data, as indicated in FIG. 11A.

Figure 11B:
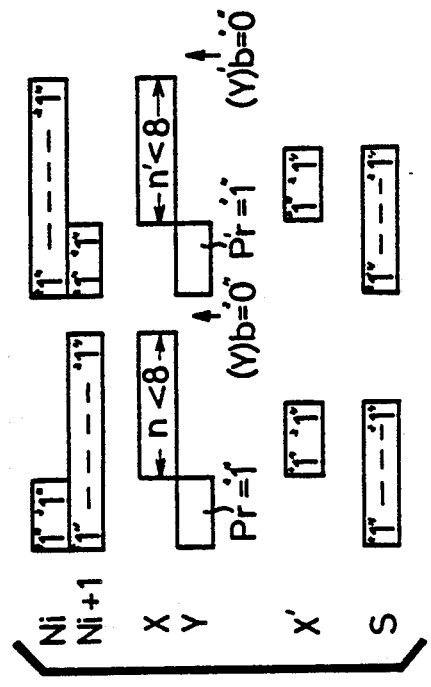
Figure 11C:
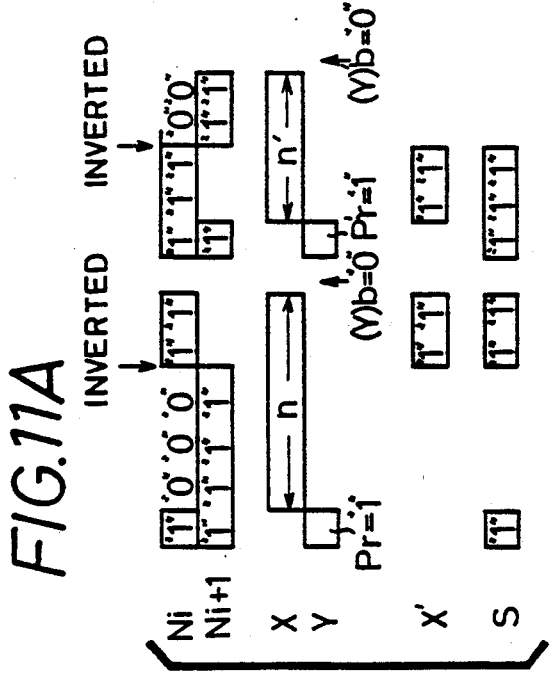

(ii) Where the number "n" of the successive bits "1" in the processing range of the X data is equal to or larger than "8" while the logical values of the $N_i$ line data bits corresponding to the processing range of the X data are all "1" (the content of the m-flag 25e is "1"), the X' data is prepared such that the logical values of the X' data bits corresponding to the last four bits in the processing range of the X data are "0", and the smoothing line data S is prepared, as indicated in FIG. 11B. Where the number "n" of the successive bits "1" in the processing range of the X data is equal to or larger than "8" while the logical values of the $N_i$ line data bits corresponding to the processing range of the X data are all "0" (the content of the m-flag 25e is "0"), the X' data is prepared such that the logical values of only the X' data bits corresponding to the first four bits in the processing range of the X data are "1", and the smoothing line data S is prepared, as indicated in FIG. 11C.

Figure 11D:
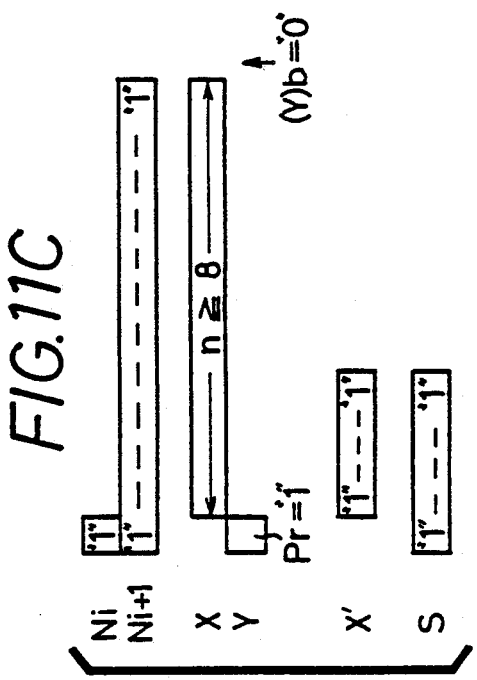

(iii) Where the number "n" of the successive bits "1" in the processing range of the X data is smaller than "8" while there no occurrence of inversion of the logical values of the $N_i$ line data (the content of the f-flag 25f is "0"), the X' data is prepared such that the logical values of the X' data bits corresponding to the first or left half of the processing range of the X data are "1" while the logical values of the X' data bits corresponding to the second or right half of the processing range of the X data are "0", and the smoothing line data S is prepared, as indicated in FIG. 11D.

Referring to FIGS. 12A–12D, there will be described the manner of preparing the X' data in sub-step S724 in the fourth case "0"-"0". In this case, the logical values (Pr) and (Y)b of the Y data bits which precede the processing range of the X data are both "0".

(i) Where there exists at least one occurrence of inversion of the logical values of the $N_i$ line data within the processing range of the X data (where the content of the f-flag 25f is "1"), the X' data is prepared such that the X' data is the same as the $N_i$ line data, and the smoothing line data is the same as the $N_i$ line data, as indicated in FIG. 12A.

(ii) Where the logical values of the $N_i$ line data bits corresponding to the processing range of the X data are all "1" (the content of the m-flag 25e is "1"), the X' data is prepared such that the logical values of the X' data bits corresponding to the first and last bits in the processing range of the X data are "0", and the smoothing line data S is prepared, as indicated in FIG. 12B.

(iii) Where the logical values of the $N_i$ line data bits corresponding to the processing range of the X data are all "0" (the content of the m-flag 25e is "0"), the X' data is the same as the $N_i$ line data, and the smoothing line data S is the same as the X' data. That is, the smoothing line data S is prepared such that the logical values of all the S data bits are "0", as indicated in FIG. 12B.

Referring next to FIGS. 13–16, there will be described various cases of an operation to record the smoothing line (indicated at S in the figures) according to the smoothing line data S, between the two adjacent lines $N_i$ and $N_{i+1}$. It will be understood that the FIGS. 13A–D, FIGS. 14A–D, FIGS. 15A–D and FIGS. 16A–C correspond to FIGS. 9A–D, FIGS. 10A–D, FIGS. 11A–D and FIGS. 12A–C, respectively. Further, FIG. 13A-1 shows the prior art while FIG. 13A-2 shows the operation according to the present embodiment of the invention. Similarly, the numeral "1" following the characters "A", "B", "C" and "D" of FIGS. 13–16 indicates the prior art, while the numeral "2" following these characters indicates the present embodiment. As is apparent from FIGS. 13–16, the smoothing line S interposed between the adjacent lines $N_i$ and $N_{i+1}$ according to the principle of the invention is effective to smoothly connect the images of the adjacent lines $N_i$ and $N_{i+1}$ or increase the continuity of images of the adjacent lines, particularly in the cases of FIGS. 13C-2, 14B-2, 14C-2, 14D-2, 15B-2, 15C-2, 15D-2 and 16B-2, as compared with the corresponding prior cases of FIGS. 13C-1, 14B-1, 14C-1, 14D-1, 15B-1, 15C-1, 15D-1 and 16B-1 in which no interposed smoothing line is provided between the adjacent lines $N_i$ and $N_{i+1}$. Accordingly, the recording in the STANDARD RESOLUTION mode can be achieved with smooth transition of images where the images have stepped or shoulder portions.

In the illustrated embodiment described above, sub-steps S721–S723 check if the number "n" of the successive bits "1" of the X data (in the processing range) is equal to or larger than "8" or not, in order to determine the manner of preparing the X' data (i.e., smoothing line data S). Further, the first or last four bits of the X' data are determined to be "1" or "0", in sub-step S722 (FIGS. 11B and 11C), for example. However, these control values (e.g., "8" and "4") may be suitably modified. If the control value "4" used in sub-steps S722 is increased, an image in the form of a curved or inclined line intersecting the lines $N_i$ and $N_{i+1}$ may be recorded with increased continuity of images, while an image in the form of a crisscrossing pattern (having a segment substantially parallel to the lines $N_i$ and $N_{i+1}$) tends to be thickened at its intersection. In this case, therefore, the perpendicularity of images or the squareness of corners of the images is deteriorated. If the control value "4" is reduced, on the other hand, the continuity of a curved or inclined line is lowered to the level of the prior art recording, while the thickening at the intersection of a crisscrossing pattern can be avoided.

Although the microcomputer 26 of the recording apparatus is adapted to prepare the smoothing line data S, it is possible that the smoothing line data S is prepared by an external device and is fed to the control system of the recording apparatus together with the $N_i$ and $N_{i+1}$ line data, so that the smoothing line may be recorded according to the received smoothing line data between the lines recorded according to the $N_i$ line data and the $N_{i+1}$ line data.

As described above, the smoothing line data S is prepared to insert the smoothing line between the lines $N_i$ and $N_{i+1}$ is the STANDARD RESOLUTION mode as indicated in FIG. 5. However, the smoothing line data S may be used in a SPECIAL mode, and the STANDARD RESOLUTION mode is adapted so as to effect the conventional recording operation as indicated in FIG. 6A in which two lines are recorded successively according to each set of $N_i$ line data. In this case, the recording apparatus has three modes of operation, i.e., STANDARD RESOLUTION mode (corresponding to FIG. 6A), HIGH RESOLUTION mode (corresponding to step S9 of FIG. 5), and SPECIAL mode (corresponding to steps S2–S8 of FIG. 5).

It will be understood that the smoothing line data S is used to effect a secondary or supplemental recording operation which follows the primary recording operation according to the $N_i$ line data, so that the smoothing line recorded according to the smoothing line data S improves the quality of the recorded images, over the quality obtained in the prior art in which two successive lines are recorded according to the same set of line data, as indicated in FIG. 6A.

Figure 3:
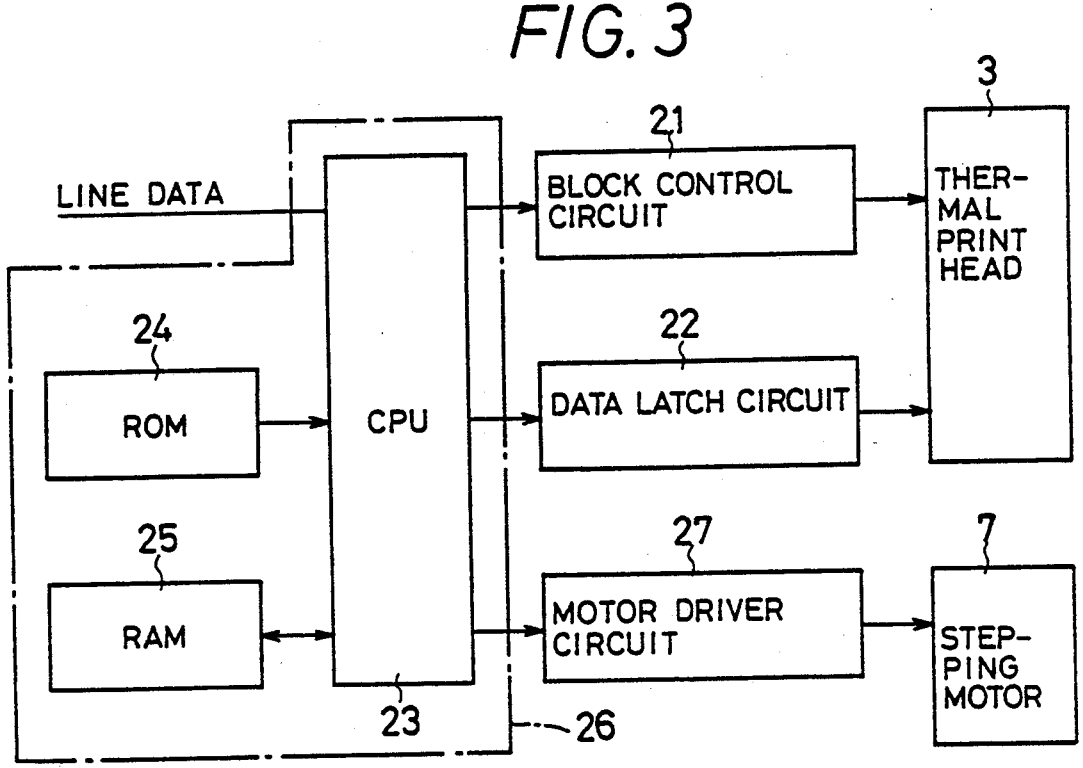
FIG. 3 is a schematic block diagram showing a control system of the recording apparatus.
Figure 17:
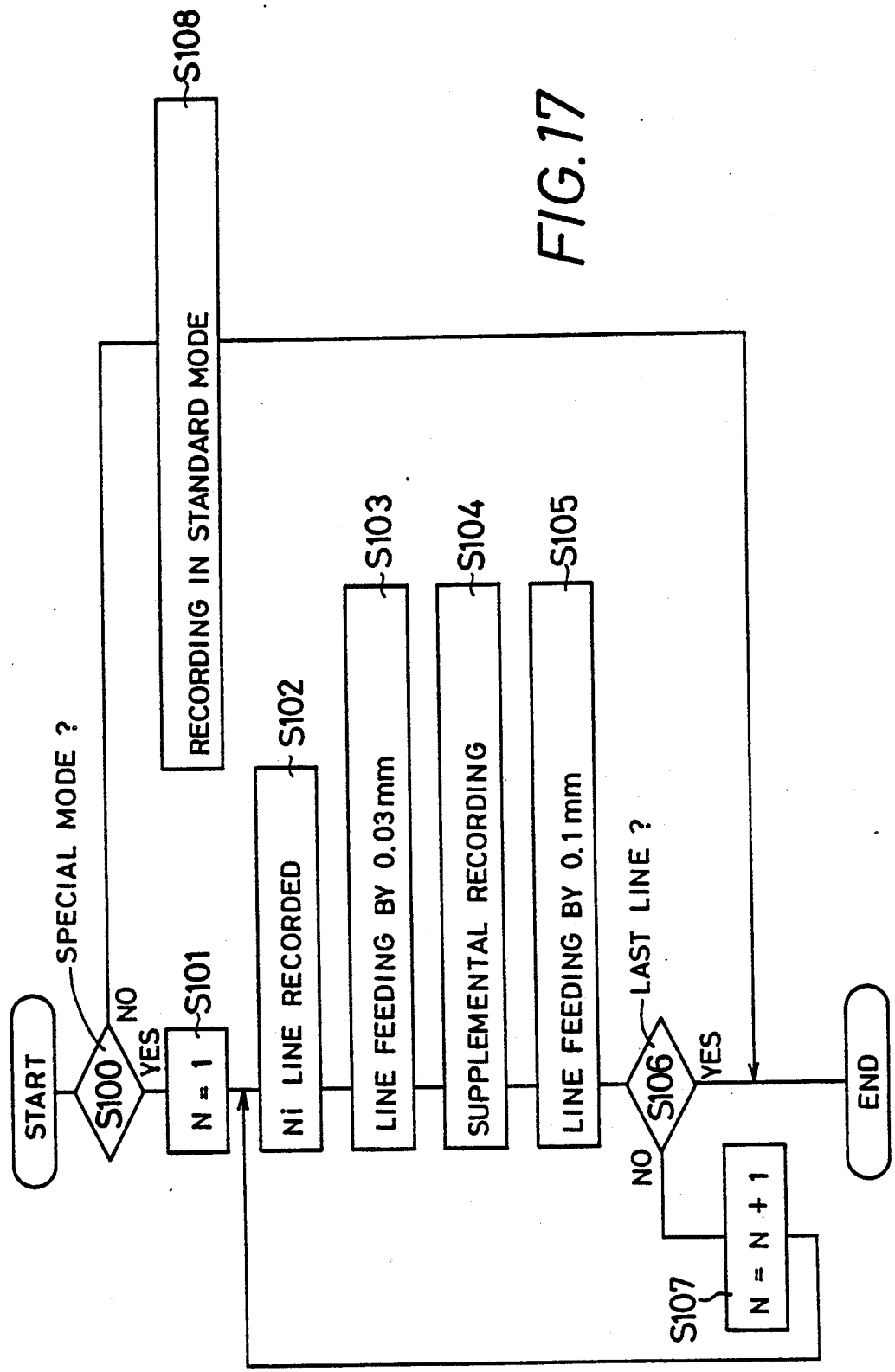
FIG. 17 is a flow chart illustrating another embodiment of the present invention.

Referring to FIGS. 17 and 18, another embodiment of the present invention will be described. In the present recording apparatus, there are available two operation modes, i.e., SPECIAL mode and STANDARD mode. The recording apparatus has substantially the same construction as illustrated in FIG. 1, and is controlled by substantially the same control system as illustrated in FIG. 3. However, the ROM 24 of the microcomputer 26 of the present apparatus stores a program for executing a control program as illustrated in FIG. 17, and the RAM 25 has a line counter N whose count designates a set of line data, namely, a line to be recorded according to the set of line data. Each heat-generating element 10 of the thermal print head 3 has an effective recording length of 0.1 mm in the direction of feed of the heat-sensitive paper 8.

In the STANDARD mode, each line of information is recorded according to a corresponding set of line data received by the CPU 23, and the paper 8 is fed by an incremental distance of 0.13 mm. Therefore, there is left a blank spacing of 0.03 mm between the adjacently recorded lines, and the image density is relatively low, and the outline of the printed image is not sufficiently smooth or beautiful.

When the SPECIAL mode is selected, a supplemental recording operation is effected following a primary recording operation, in order to improve the recording quality.

A recording operation of the present recording apparatus will be described referring to the flow chart of FIG. 17.

Initially, step S100 is implemented to determine whether the control system is placed in the SPECIAL mode or not. If the STANDARD mode is selected, the control flow goes to step S108 in which the STANDARD mode of operation is performed such that the paper 8 is fed by the incremental distance of 0.13 mm after the recording of each line according to a corresponding set of line data. Accordingly, there is left the 0.03 mm spacing between the lower and upper edges of the dots recorded in the adjacent two lines recorded.

If an affirmative decision (YES) is obtained in step S100, that is, if the SPECIAL mode is selected, step S100 is followed by step S101 in which the line counter N provided in the RAM 25 is initialized to "1". Then, the control flow goes to step S102 in which the first line is recorded on the paper 8, according to the designated first set of line data via the circuits 21, 22, such that the heat-generating elements 10 are selectively energized for a time period of 0.8 ms. As a result, a primary printing is effected to record the first line over an area of 0.1 mm as measured in the feeding direction of the paper 8, which corresponds to the effective recording length of the heat-generating elements 10.

Then, step S103 is implemented to feed the paper 8 by a distance of 0.03 mm relative to the thermal head 3, as indicated in FIG. 18, whereby the lower edge of the heat-generating elements 10 is aligned with the upper end of the line to be recorded according to the next set of line data. Step S103 is followed by step S104 in which a supplemental recording is effected according to the set of line data currently designated by the line counter N, i.e., according to the line data used in step S102 for the primary printing of the first line. In this supplemental recording, the heat-generating elements 10 are selectively energized for a time period of 0.4 ms. As a result of the primary and supplemental recording operations in steps S102 and S104, the recording takes place over an area of 0.13 mm as measured in the feeding direction of the paper 8.

Then, step S105 is implemented to feed the paper 8 by a distance of 0.1 mm relative to the thermal print head 3. Consequently, the upper edge of the heat-generating elements 10 is aligned with the upper end of the line to be recorded according to the next set of line data. Step S105 is followed by step S106 to determine whether the set of line data used in steps S102 and S104 is the last set of data for the last line of a text. If an affirmative decision (YES) is obtained in step S106, the control routine of FIG. 17 is terminated. If a negative decision (NO) is obtained in step S106, namely, if the set of line data currently designated by the line counter N is not the last set of line data, the control flow goes to step S107 to increment the line counter N, and returns to step S102. Steps S102–S107 are repeatedly executed until the last line of the relevant text has been recorded on the paper 8.

In FIG. 18, 0.13 mm indicates the size of each relatively elongated dot formed by the primary and supplemental recording operations according to each set of line data, while 0.03 mm indicates the distance of feeding of the paper 8 after the primary recording operation and before the supplemental recording operation It will be understood that the size of the dot is larger than the effective recording length of the heat-generating elements 10. The dot size of 0.13 mm obtained by the supplemental recording in step S104 combined with the primary recording in step S102 is substantially equal to the dot size where 7.7 lines are recorded over an area of 1 mm in the feeding direction of the paper 8. Thus, the present recording apparatus does not suffer from a blank spacing (0.03 mm) as encountered in the STAN- DARD mode, and assures a relatively high density of recording and a sufficiently smooth outline of the printed image.

In the illustrated embodiment of FIGS. 17 and 18, the energization time of the heat-generating elements 10 of the print head 3 for the primary recording in step S102 is 0.8 ms, while that for the supplemental recording in step S104 is reduced to 0.4 ms since the heat-generating elements 10 which were energized for the primary recording maintain residual heat at the time these elements 10 are energized to effect the supplemental recording. The energization time for the supplemental recording may be shortened as the time between the primary and supplemental recordings decreases.

In the recording apparatus of FIGS. 17 and 18, the primary recording according to each set of line data is conducted such that the upper edge of the heat-generating elements 10 having the effective recording length or height of 0.1 mm is aligned with the upper end of a line to be recorded, and then the paper 8 is fed by the distance of 0.03 mm so that the lower edge of the elements 10 is aligned with the lower end of the recorded line. In this condition, the supplemental recording is carried out before the paper 8 is fed by the distance of 0.1 mm to the next line position. Thus, the dots formed by the primary and secondary recordings cover the total area of 0.13 mm, which is larger than the effective recording length of 0.1 mm of the heat-generating elements 10 and which is equal to the incremental feeding distance in the STANDARD mode of step S108. In other words, there is left no blank spacing which is provided between the adjacent lines recorded in the STANDARD mode in which the incremental feeding distance of 0.13 mm is larger than the effective recording length of the heat-generating elements 10.

While the present invention has been described in its presently preferred embodiments, it is to be understood that the invention is not limited to the details of the illustrated embodiment, but may be embodied with various changes, modifications and improvements, which may occur to those skilled in the art, without departing from the spirit and scope of the invention defined in the appended claims.

For example, the SPECIAL mode of the second embodiment of FIGS. 17 and 18 may be provided in the first embodiment of FIG. 5, in addition to the STANDARD RESOLUTION mode of steps S2-S8 and the HIGH RESOLUTION mode of step S19, or in place of the STANDARD RESOLUTION mode.

Although the second embodiment is adapted such that only one supplemental recording operation is effected following the primary recording operation, two or more supplemental recording operations may be effected. In this case, steps S103-S105 are suitably modified.

Further, the recording apparatus of the second embodiment may have a high resolution mode similar to that of step S9 of FIG. 5, in addition to the STANDARD mode of step S108, or in place of the STANDARD mode.

What is claimed is:

1. A recording apparatus for recording images on a planar recording medium, comprising:
    a print head having a plurality of dot-forming elements arranged in a straight row, for recording dots in a recording line parallel to said straight row, an effective recording size of each of said dot-forming elements in a feeding direction of the recording medium perpendicular to said straight row being smaller than a thickness of said recording line in said feeding direction;
    medium support means for supporting said recording medium such that said print head faces a surface of said recording medium;
    feeding means for feeding said recording medium and said print head relative to each other in said feeding direction; and
    control means for selectively energizing said dot-forming elements to effect a primary recording operation such that upper edges of said dot-forming elements are substantially aligned with an upper end of said recording line, and controls said feeding means to feed said recording medium and said print head relative to each other in said feeding direction by a predetermined distance after energization of said dot-forming elements, until lower edges of said dot-forming elements are substantially aligned with a lower end of said recording line, said control means selectively energizing, after said recording medium and said print head have been fed by said predetermined distance, those of said dot-forming elements which have been energized for said primary operation, whereby a secondary recording operation is effected with the lower edges substantially aligned with the lower end of said recording line.

2. A recording apparatus according to claim 1, wherein said dot-forming elements comprise a plurality of heat-generating elements.

3. A recording apparatus according to claim 2, wherein said control means selectively energizes said heat-generating elements to effect said secondary recording operation, for a time period shorter than that for said primary recording operation.

4. A recording apparatus according to claim 2, wherein said heat-generating elements are arranged in a straight row parallel to said straight line, so as to cover an effective recording width of said recording medium.

5. A recording apparatus for recording images such as characters and graphical representations on a recording medium, according to sets of line data indicative of presence or absence of dots in respective recording lines, comprising:
    data processing means for preparing a set of smoothing line data representative of a smoothing line, based on a first set of line data representative of a line $N_i$, wherein i is a natural number, and a second set of line data representative of a line $N_{i+1}$, such that said smoothing line improves accuracy of reproduction of original images on said recording medium, by connecting the two lines $N_i$ and $N_{i+1}$ by said smoothing line; and
    recording means for recording said smoothing line between said two lines $N_i$ and $N_{i+1}$,
    said data processing means determining a processing range of said first and second sets of line data, in which either and only one of each pair of bits of said first and second sets of line data which correspond to each other in a direction of said two lines $N_i$ and $N_{i+1}$ is indicative of the presence of a dot, said data processing means effecting a first determination as to whether or not all of the bits in said processing range of one of said first and second sets of line data are indicative of the presence of dots while all of the bits in said processing range of the other set are indicative of the absence of dots, and effecting a second determination as to whether a bit of said other set of line data which is adjacent to one of opposite ends of said processing range outwardly of said processing range is indicative of the presence of a dot, while a bit of said other set of line data which is adjacent to the other end of said processing range outwardly of said processing range is indicative of the absence of a dot, said data processing means preparing, when said first and second determinations are affirmative, said set of smoothing line data such that successive bits of said smoothing line data from a position corresponding to said bit adjacent to said one end of said processing range to an intermediate position of said processing range are indicative of dots.

6. A recording apparatus according to claim 5, wherein said data processing means prepares said set of smoothing line data such that the bits of said smoothing line data corresponding to the bits in said processing range of said first and second sets of line data are the same as the corresponding bits of said first set of line data, if said processing range of said first set of line data consists of at least one bit indicative of the presence of a dot and at least one bit indicative of the absence of a dot.

7. A recording apparatus according to claim 5, wherein said data processing means prepares said set of smoothing line data such that the bits of said smoothing line data corresponding to the bits in said processing range of said first and second sets of line data are all indicative of the absence of dots, if all of the bits in said processing range of said first set of line data are indicative of the absence of dots while all of the bits in said processing range of said second set of line data are indicative of the presence of dots, and if bits of said first set of line data which are adjacent to the opposite ends of said processing range outwardly of said processing range are both indicative of the absence of dots.

8. A recording apparatus for recording images such as characters and graphical representations on a recording medium, according to sets of line data indicative of presence or absence of dots in respective recording lines, comprising:
 data processing means for preparing a set of smoothing line data representative of a smoothing line, based on a first set of line data representative of a line $N_i$, wherein i is a natural number, and a second set of line data representative of a line $N_{i+1}$, such that said smoothing line improves accuracy of reproduction of original images on said recording medium, by connecting the two lines $N_i$ and $N_{i+1}$ by said smoothing line; and
 recording means for recording said smoothing line between said two lines $N_i$ and $N_{i+1}$,
 said data processing means determining a processing range of said first and second sets of line data, in which either and only one of each pair of bits of said first and second sets of line data which correspond to each other in a direction of said two lines $N_i$ and $N_{i+1}$ is indicative of the presence of a dot, said data processing means effecting a first determination as to whether or not all of the bits in said processing range of said first set of line data are indicative of the absence of dots while all of the bits in said processing range of said second set of line data are indicative of the presence of dots, and effecting a second determination as to whether bits of said first set of line data which are adjacent to opposite ends of said processing range outwardly of said processing range are both indicative of the presence of dots, said data processing means preparing, when said first and second determinations are affirmative, said set of smoothing line data such that two groups of successive bits of said smoothing line data from respective positions corresponding to said bits adjacent to said opposite ends of said processing range to a position before a middle position of said processing range are indicative of the presence of dots.

9. A recording apparatus according to claim 8, wherein said data processing means prepares said set of smoothing line data such that the bits of said smoothing line data corresponding to the bits in said processing range of said first set of line data are the same as the corresponding bits of said first set of line data, if the number of the bits of said processing range is smaller than a predetermined value.

10. A recording apparatus according to claim 8, wherein said data processing means prepares said set of smoothing line data such that the bits of said smoothing line data corresponding to the bits in said processing range of said first and second set of line data are indicative of the presence of dots, if all of the bits in said processing range of said first set of line data are indicative of the presence of dots while all of the bits in said processing range of said second set of line data are indicative of the absence of dots, and if bits of said second set of line data which are adjacent to opposite ends of said processing range outwardly of said processing range are both indicative of the presence of dots.

11. A recording apparatus for recording images such as characters and graphical representations on a recording medium, according to sets of line data indicative of presence or absence of dots in respective recording lines, comprising:
 data processing means for preparing a set of smoothing line data representative of a smoothing line, based on a first set of line data representative of a line $N_i$, wherein i is a natural number, and a second set of line data representative of a line $N_{i+1}$, such that said smoothing line improves accuracy of reproduction of original images on said recording medium, by connecting the two lines $N_i$ and $N_{i+1}$ by said smoothing line; and
 recording means for recording said smoothing line between said two lines $N_i$ and $N_{i+1}$,
 said data processing means determining a processing range of said first and second sets of line data, in which either and only one of each pair of bits of said first and second sets of line data which correspond to each other in a direction of said two lines $N_i$ and $N_{i+1}$ is indicative of the presence of a dot, said data processing means effecting a first determination as to whether or not all of the bits in said processing range of said first set of line data are indicative of the absence of dots while all of the bits in said processing range of said second set of line data are indicative of the presence of dots, and effecting a second determination as to whether bits of said second set of line data which are adjacent to opposite ends of said processing range outwardly of said processing range are both indicative of the absence of dots, said data processing means preparing, when said first and second determinations are affirmative, said set of smoothing line data such that successive bits of said smoothing line data corresponding to an intermediate area of said processing range whose opposite ends are spaced apart from said opposite ends of said processing range are indicative of the presence of dots.

12. A recording apparatus for recording images such as characters and graphical representations on a recording medium, according to sets of line data indicative of presence or absence of dots in respective recording lines, comprising:

data processing means for preparing a set of smoothing line data representative of a smoothing line, based on a first set of line data representative of a line $N_i$, wherein i is a natural number, and a second set of line data representative of a line $N_{i+1}$, such that said smoothing line improves accuracy of reproduction of original images on said recording medium, by connecting the two lines $N_i$ and $N_{i+1}$ by said smoothing line; and recording means for recording said smoothing line between said two lines $N_i$ and $N_{i+1}$, each bit of said first and second sets of line data being indicative of the presence of a dot when a logical value of said each bit is "1" while said each bit is indicative of the absence of a dot when said logical value is "0", said data processing means determining a processing range of said first and second sets of line data, in which a logic value of an exclusiveor operation in connection with the corresponding bits of said first and second sets of line data is "1", said data processing means preparing said set of smoothing line data, such that logical values of the bits of said smoothing line data corresponding to the bits in said processing range of said first and second sets of line data are determined depending upon the logical values of the corresponding bits of said first and second sets of line data.

13. A recording apparatus according to claim 12, further comprising a print head having a linear array of heat-generating elements for forming dots along a straight line.

14. A recording apparatus according to claim 13, further comprising feeding means for feeding the recording medium and said print head relative to each other in a feeding direction which intersects said straight line, and wherein said recording means selectively energizes said heat-generating elements according to said first set of line data to record said line $N_i$ such that upper edges of said heat-generating elements are substantially aligned with an upper end of a recording line parallel to said straight line, said recording means controlling, after said line $N_i$ is recorded, said feeding means to feed said recording medium and said print head relative to each other in said feeding direction such that lower edges of said heat-generating elements are substantially aligned with a lower end of said recording line, said recording means then selectively energizing said heat-generating elements according to said set of smoothing line data to record said smoothing line before said line $N_{i+1}$ is recorded.

15. A recording apparatus according to claim 14, wherein said recording means selectively energizes said heat-generating elements according to said set of smoothing line data, for a time period shorter than that for said lines $N_i$ and $N_{i+1}$.

16. A recording apparatus according to claim 13, wherein said heat-generating elements are arranged in a straight row parallel to said straight line, so as to cover an effective recording width of said recording medium.

17. A recording apparatus according to claim 12, wherein said data processing means prepares said set of smoothing line data selectively in four different manners which are selected according to respective four combinations of two logical values (1, 1), (0, 1), (1, 0) and (0, 0) of respective "and" operations in connection of two pairs of bits of said first and second sets of line data which are adjacent to opposite ends of said processing range outwardly of said processing range.

* * * * *